US011127089B1

(12) United States Patent
Hernandez et al.

(10) Patent No.: US 11,127,089 B1
(45) Date of Patent: Sep. 21, 2021

(54) SYSTEMS AND METHODS FOR CREATING, PROCESSING, MANAGING, AND TRACKING MULTIVARIANT TRANSACTIONS

(71) Applicant: UIPCO, LLC, San Antonio, TX (US)

(72) Inventors: Heather Hernandez, San Antonio, TX (US); Jeff Easley, San Antonio, TX (US); Gunjan Vijayvergia, San Antonio, TX (US); Mark Warnick, San Antonio, TX (US); Maland Mortensen, San Antonio, TX (US)

(73) Assignee: UIPCO, LLC, San Antonio, TX (US)

( * ) Notice: Subject to any disclaimer, the term of this patent is extended or adjusted under 35 U.S.C. 154(b) by 280 days.

(21) Appl. No.: 15/248,892

(22) Filed: Aug. 26, 2016

Related U.S. Application Data

(60) Provisional application No. 62/209,957, filed on Aug. 26, 2015.

(51) Int. Cl.
*G06Q 40/00* (2012.01)
*H04L 29/08* (2006.01)
*G06F 16/21* (2019.01)

(52) U.S. Cl.
CPC ............. *G06Q 40/12* (2013.12); *G06F 16/21* (2019.01); *H04L 67/306* (2013.01)

(58) Field of Classification Search
CPC ........ G06Q 40/12; G06F 16/21; H04L 67/306
See application file for complete search history.

(56) References Cited

U.S. PATENT DOCUMENTS

| 7,676,034 B1* | 3/2010 | Wu ................... H04M 15/8061 |
| | | 379/265.01 |
| 7,840,226 B1* | 11/2010 | Walsh .................. H04L 63/107 |
| | | 455/456.1 |
| 7,881,957 B1* | 2/2011 | Cohen ................... G06Q 10/06 |

(Continued)

OTHER PUBLICATIONS

Zhang, Lan, et al. "Mechanism design for finding experts using locally constructed social referral web." in TPDS. 2013. (Year: 2013).*

*Primary Examiner* — Asfand M Sheikh
(74) *Attorney, Agent, or Firm* — Kane Kessler, P.C.; Barry E. Negrin

(57) ABSTRACT

A computer-based system and method for managing multi-variant transactions having non-linear components is provided. A database of users includes user profiles with information corresponding to the respective user. The system also includes or maintains a database of transactions between or among users, the transactions including proposed transactions and completed transactions. Software is provided enabling the pairing of at least one non-linear non-financial variable with at least one transaction between or among users, the non-linear non-financial variable received from one of the users involved in the transaction. Where the transactions are specific performance transactions, they can be weighted differently with respect to each other based on type or based on at least one of either the performer or the recipient of the specific performance transaction. Optionally, user profiles include a trustworthiness score generated based on an aggregation of the user's specific performance transactions with other users.

18 Claims, 16 Drawing Sheets

(56) References Cited

U.S. PATENT DOCUMENTS

| | | | |
|---|---|---|---|
| 8,024,211 B1* | 9/2011 | Cohen | G06Q 10/063112 705/7.14 |
| 9,406,031 B2* | 8/2016 | Calman | G06Q 10/00 |
| 9,602,541 B2* | 3/2017 | Wong | H04L 63/20 |
| 9,671,776 B1* | 6/2017 | Beard | G05B 19/4063 |
| 2001/0034689 A1* | 10/2001 | Heilman, Jr. | G06Q 40/04 705/37 |
| 2002/0116287 A1* | 8/2002 | Schubert | G06Q 30/06 705/26.61 |
| 2006/0064409 A1* | 3/2006 | Hardwick | G06Q 30/06 |
| 2006/0112086 A1* | 5/2006 | Douress | G06F 17/3087 |
| 2007/0174084 A1* | 7/2007 | Goldman | G06F 19/3481 705/2 |
| 2008/0059215 A1* | 3/2008 | Boyd | G06Q 30/02 705/26.8 |
| 2008/0294501 A1* | 11/2008 | Rennich | G06Q 30/02 705/7.29 |
| 2010/0274580 A1* | 10/2010 | Crownover | G06Q 10/04 705/2 |
| 2011/0238763 A1* | 9/2011 | Shin | G06Q 10/10 709/206 |
| 2013/0073473 A1* | 3/2013 | Heath | G06Q 30/06 705/319 |
| 2013/0262175 A1* | 10/2013 | Deshpande | G06Q 10/06 705/7.25 |
| 2014/0032434 A1* | 1/2014 | Kumar | G06Q 30/08 705/319 |
| 2014/0074656 A1* | 3/2014 | Stehrenberger | G06Q 30/0619 705/26.44 |
| 2014/0164167 A1* | 6/2014 | Taylor | G06Q 30/0611 705/26.4 |
| 2014/0222833 A1* | 8/2014 | Jia | G06Q 30/02 707/748 |
| 2015/0120351 A1* | 4/2015 | Dorner | G06Q 10/063118 705/7.14 |
| 2015/0150090 A1* | 5/2015 | Carroll | G06F 21/316 726/3 |
| 2015/0154667 A1* | 6/2015 | Hicks | G06Q 30/0279 705/26.41 |
| 2015/0170148 A1* | 6/2015 | Priebatsch | G06Q 20/4016 705/44 |
| 2015/0324805 A1* | 11/2015 | Skiba | G06Q 50/01 705/7.13 |
| 2016/0180325 A1* | 6/2016 | Davis | G06Q 20/085 705/44 |
| 2016/0307131 A1* | 10/2016 | Wang | G06Q 10/06311 |
| 2017/0019496 A1* | 1/2017 | Orbach | H04L 67/306 |
| 2017/0083881 A1* | 3/2017 | Sardela Bianchi | G06Q 20/102 |

* cited by examiner

SYSTEMS AND METHODS FOR CREATING, PROCESSING, MANAGING, AND TRACKING MULTIVARIANT TRANSACTIONS

RELATED APPLICATIONS

Priority is claimed from U.S. Provisional Patent Application No. 62/209,957 filed Aug. 26, 2015 and entitled "SYSTEMS AND METHODS FOR CREATING, PROCESSING, MANAGING, AND TRACKING MULTIVARIANT TRANSACTIONS", the entirety of which is incorporated by reference herein.

BACKGROUND OF THE INVENTION

Field of the Invention

The invention relates generally to digital accounting and social media. More particularly, the invention relates to systems and methods for creating, processing, managing, and tracking multivariant transactions that have both financial and social components.

Description of the Related Art

For about as long as we have been able to account for things in written form, we have represented this information in cold hard numerical values. This has proven immensely valuable in delivering the accuracy and transparency that serves as the foundation of modern financial systems used around the world, even as information has mostly moved from written to digital form. When it comes to keeping up with our own personal finances, methods may vary, but we still rely on numerical representations to account accurately for what we have, what we owe, and what we have left to be able to acquire desired goods and services (at least for those of us willing to spend the time making sure the numbers accurately represent our recent activities).

What is not recorded and represented in these financial records is the rich context we need to define the meaning behind the transactions. The drudgery in everyday finances comes in part from having to piece back together the story using only on the numerical values we see in a transaction register. We are missing important context that delivers the meaning, such as who you were with, where you were, what the atmosphere was like, what time it was, how you felt at that moment, what you intended to do with what you purchased (i.e. gift), and what social obligations you were meeting (donating, contributing, sponsoring, paying someone back, etc.).

While, in recent times, the digital revolution has allowed us to express, represent, and share (and record) our non-financial lives with others, we have yet to connect what we do in our social lives with our personal financial records. This is a key reason why a majority of banking consumers in the U.S. does not spend the necessary time managing personal finances. Much of the menial, repetitive work required to understand and manage your accounts is literally mapping what happened in your daily life to what you see in numerical form in bank records.

Further, financial records do not allow us to keep account of our social obligations. Keeping tabs on non-financial obligations (favors) may range from pure memory recall to keeping things in a system of record. Even if represented digitally, tracking social obligations is separate and distinct from financial records held at one's financial institution. Social obligations can include watching a neighbor's home while they are away, covering a meal the next time you meet with a friend (to pay them back), returning something you borrowed, following up on something you lent out, inviting friends over (to repay them for hosting you last time), etc. This means another set of records to keep track of, even if you rely on mental accounting to do so.

Finally, the convergence of our social and financial lives in a digital world creates the opportunity to help us manage social events both in the traditional planning sense along with a way of tracking group member obligations—whether they are monetary or otherwise. For example, social media tools (digital "meet-ups", calendar "e-vites") can be used for organizing, managing, and recording events at a social function. After the fact, financial transactions are used determine if group members met financial obligations (i.e.— did John pay his $20 share for the food?). Here again, these are separate and distinct functions in support of a social event that are currently handled by various disconnected solutions.

There is thus a long-felt need to converge social meaning with financial record keeping to "humanize" transactions in a way that A) adds rich social context to the transaction experience; B) expands the universe of transactions to include non-monetary social obligations; C) expands the set of people with whom one can transact; D) ties the universe of transactions along with the related set of people into the record keeping and payment facilitation of a financial institution; E) is platform agnostic and universally accessible in the digital realm; and F) creates a transaction history expressed as or with a social timeline.

SUMMARY OF THE INVENTION

The invention is a system and method for managing multivariant transactions having non-linear components, in which a non-linear non-financial variable is paired with a financial transaction. Several aspects of the invention follow.

In a first aspect of the invention, a basic financial transaction is augmented to include one or more informational quanta at least tangentially related to the transaction along with the transaction itself. Basic financial transactions include, and are not limited to, common credits and debits within a checking account, a prepaid card or a credit card account as a result of a payment vehicle such as a debit card, a personal check, a wire transfer, a person-to-person money transfer via Automated Clearing House (ACH) network, etc. or even a cash deposit or withdrawal via ATM or a bank teller. Such related informational quanta might include the following: a thank you note from the recipient to the sender; audio/video recordings from the recipient to the sender about the received item or experience; text messages and social media posts about the transaction, received item, or experience that are automatically retrieved without the person having to manually associate relevant content; time, weather, venue and geo-location content related to the item or event; photos of the item or of the recipient using the item; and the like. Additionally aggregated information over time might also be displayed (related to the transaction history with this person, at this location, in this area, etc.)— graphical/numerical report/quick glance.

In any of the above non-limiting examples, after the recipient sends related informational quanta to the sender, the sender can send other related informational quanta back to the recipient, in the form of a conversation. This transaction/conversation can be ephemeral, like a SnapChat photograph, or it can be stored in a journal or record, either integrally with a user's social media account or separately in a discreet app, system, or environment. As with any communication, the record of the transaction can be made as public or as private as the participant's desire via various levels of privacy settings. Multiple transactions can be accumulated to create a trustworthiness "credit score" as described in more detail below.

The identification, retrieval, and association of informational quanta associated with the transactional record is preferably executed on an automatic basis, delivering a key customer value in the removal of a repetitive, tedious, and manually taxing manual process. Further, the aggregation of this important social context allows customers to access these quanta historically and share them at later dates with the same relevant group of people or with others new to the event/transaction. Any associations that were made manually by the user would be stored and learned off of so that future similar associations could be then made automatically. The system can also learn based on the associations of others. Similar people might have automatic associations made. Public associations/transactions within a network could be crowdsourced and reflect the feedback of multiple people within the transaction. Individuals would not need to duplicate associations that others made, if security permissions allowed.

In a second aspect of the invention, the system/method enables the expansion of the types, numbers, and qualities of digital transactions to include non-monetary social obligations. Preferably, the invention enables the increasing of the number of participants to a transaction to greater than the conventional two. Instead of simply limiting transactions to being between two people, the invention contemplates group transactions, such as soliciting a number of friends for a collection, e.g., for someone's birthday. Other transactional variations enabled by the system/method include: negotiating the terms of the transaction, such as the amount (more or less than requested), the payback date, lump sum versus installments, and the like. Additional embodiments can also follow a crowdsource model. One will not need to go to an external website to receive crowdsourced payments—they could be incorporated into one's bank and credit/social clout, etc. could be incorporated into the risk investors might face.

To this end, the system/method preferably includes a digital/automated obligation manager that serves as the collector and balancer of obligations to eliminate interpersonal friction. Based on the settings of the group organizer or other administrative entity, the digital manager displays to all group members the status of obligations, in order to apply social pressure to those who are not owning up to obligations, without directing the ensuing angst towards a human manager/organizer.

In addition to money changing hands, the invention contemplates the exchange of favors and other similar specific performance acts (hereinafter collectively "favors") while tying these into a similar financial transaction recordkeeping function provided by a financial institution. Optionally, favors can be assigned differing levels of value and need not all be on a one-to-one level of equivalence. These favors can be exchanged directly or banked via a virtual coupon book, or account, or similar ledger, so that the recipient can cash in favors at a later date. Preferably, the invention includes the ability automatically to serve up the "balance" of favors associated with an individual linked via social media tools or digital contact management solutions. In one embodiment, in choosing to post a social media comment or send a text to a friend, the favor balance is retrieved to serve as a memory aid while in the context of the digital conversation. Favors are optionally assigned a tier or point value for comparison, banking, and exchange purposes.

In another aspect of the invention, the inventive system/method enables the expansion of the set of people with whom one can transact. That is, the invention contemplates enabling other individuals (offerors) beside the initially requested person (requestee) to participate in the transaction. Knowing that the offeror is connected to the requestee makes the offeror more trustworthy to the requester than a total stranger. Different degrees of trustworthiness can be established by any of the following variables: degrees of separation from the requester, quality of the intervening relationships to the requester, quality of the intervening relationships to the offeror, and the like. This might also include the trusted relationship between the offeror and the financial institute or more highly trusted organization. Past transactional payment completion history will also be factor. The number of relationships that the offeror has with multiple people might also increase the offeror's trustworthiness score.

Over time, members of the community can develop a trustworthiness rating in carrying out promised actions or paying debts, referable to as "fiscal karma." When combined with the abovementioned journal or record of transactions and digital/automated manager of same, participants can create an entirely new type of credit score within the system/environment. Ratings can be assignable to participants on a tiered spectrum to encourage best payment/repayment practices.

In another aspect of the invention, the inventive system/method enables the tying the universe of transactions along with a related set of people, places, and things into the record keeping and payment facilitation of a financial institution. A member of a trusted financial institution agreeing to pay a certain amount of money is more trustworthy than someone simply sending an SMS message to that effect, particularly if the trusted financial institution guarantees the transaction in one form or another. Optionally, the inventive system can prevent a member from making promises s/he cannot keep, e.g., corroborating that the requested payment is less than the balance in the person's liquid account, or below a pre-set threshold set by a custodian of the account (parent, adult child of elder parent, spouse, guardian, etc.). In the case of non-financial transactions, the system can confirm that the requested action does not conflict with the proposed actor's existing calendar/schedule. Additionally, the system preferably allows the participant to keep records of these transactions that otherwise would not have a paper trail or record at a trusted institution. The trusted institution provides a safe, secured, and lasting place for this information to be housed. As social networks and cloud storage companies come and go, one's contextual memories will be protected by the same people who protect your money. Money can be transferred into accounts (e.g., retirements, trusts, college funds) with the context intended at the time of deposit by the depositor. Optionally, the "Internet of things" (connections across platforms), such as one's smart devices, smart appliances, and even a smart dwelling, also feeds into this historical information as an information broker.

In another aspect of the invention, the system/method includes a platform-agnostic and universally accessible interface in the digital realm. So that the system/method is usable both inside and outside a given financial institution, enabling the exchange of money/favors with anyone, in any digital environment, The system preferably includes the following features: 1) seamless single sign-on to multiple apps/software; and 2) universal payment interface.

Preferably, the system/method includes a single seamless sign-on interface, optionally including at least one of two features. Optionally, a participant's login/password combinations are aggregated to facilitate a participant's entry into his/her various financial accounts. An overall user profile, created once, can be implemented to allow access to a multitude of participating financial services. Optionally, the requisite apps are not delivered per se to the user's device but are instead served to the device and emulated thereon. The user is required only to download and install a basic framework app in which all other apps will be running via a remote (e.g., a trusted institution or enterprise) server. This approach serves to: reduce the amount of data the user must download; ensure that the apps are constantly updated for security and functionality purposes; customize and brand the apps to provide a unified look and feel to the user; and reduce app development cost by avoiding multiple versions of apps for different operating systems.

Preferably, the system/method includes a universal payment interface operative across any digital platform. In one embodiment, the universal payment interface includes a custom in-app keyboard. The keyboard can be used to specify the amount of money one user wants to send to another user. Activating the "pay" or "send" feature will cause the creation of a unique one-time URL to be shared as text in any application (SMS, Facebook, SnapChat, etc.). The URL will include a single use token, a unique user ID, and other relevant information. When the sender sends the text or similar message, the receiver uses the link to the URL to access a website or app to receive the payment. The receiver is not required to enroll into a service and does not have to enter any personally identifiable information, financial institution information, or the like. All the receiver need do is to identify the bank, account number, username, and password.

Both of the above features of seamless single sign-on and universal payment interface, either together or separately, will allow users to exchange money in any digital environment, both within and external to the trusted institution/enterprise.

In another aspect of the invention, the system/method enables transaction history to be expressed as a social timeline. Adding rich social context and non-monetary transactions sets the stage for a display of this information in an engaging timeline format that delivers new opportunities to recall meaningful historical context and share with others in the present and future. Features include: viewing transaction history broadly or with a specific person; reviewing budget with additional context; ability sharing transaction history with others based on filtered criteria; creating smart reminders based on historical transactional information; geographically associating transactions with places in a map view; reviewing one's life not in terms of transactions and experiences with specific individuals; and the like.

The invention includes a computer-based system for managing multivariant transactions having non-linear components. As used herein, multivariant transactions means transactions not entailing a simple transfer of a sum of money from one party to another. Multivariant transactions may also include specific performance components, as well as social context aspects. Even in the context of financial transactions, multivariant transactions can include terms such as date of payment, negotiated amounts (e.g., less or more than proposed), and the like. As used herein, non-linear components include elements that do not have a fixed form, e.g., can include text, photos, drawings, audio, video, and other similar elements and combinations thereof.

The inventive system includes a database of users, each user having a user profile with information corresponding to the respective user, as well as a database of transactions between or among users, the transactions including proposed transactions and completed transactions. Software is provided adapted to enable the pairing of at least one non-linear non-financial variable with at least one transaction between or among users, the non-linear non-financial variable received from one of the users involved in the transaction. Preferably, the non-linear non-financial variable is related to the transaction.

Preferably, the user profiles can be linked to one another. In such a case, a second user linked to a first user can access the proposed transactions available to the first user and offer to perform one or more of the transactions instead of the first user.

Optionally, the transactions include specific performance transactions. Optionally, different types of the specific performance transactions are weighted differently with respect to each other. Alternatively, different instances of the same type of the specific performance transactions are weighted differently from each other based on at least one of a) the performer of the specific performance transaction orb) the recipient of the specific performance transaction.

Optionally, user profiles include a trustworthiness score generated based on an aggregation of the user's specific performance transactions with other users.

Preferably, the inventive system is linked to a financial institution, and the financial institution preferably guarantees to the proposed recipient of a transaction that the proposed performer of a transaction is capable of performing the transaction prior to the transaction being finalized.

The invention also includes a computer-based method for managing multivariant transactions having non-linear components. A database of users is maintained, each user having a user profile with information corresponding to the respective user. A database of transactions between or among users is also maintained, the transactions including proposed transactions and completed transactions. The pairing of at least one non-linear non-financial variable with at least one transaction between or among users is enabled, the non-linear non-financial variable received from one of the users involved in the transaction. The non-linear non-financial variable is preferably related to the transaction.

Preferably, user profiles are linked to one another. Preferably, a second user linked to a first user is enabled to access the proposed transactions available to the first user and offer to perform one or more of the transactions instead of the first user.

Optionally, the transactions include specific performance transactions. Different types of the specific performance transactions may be weighted differently with respect to each other. In addition or alternatively, different instances of the same type of the specific performance transactions may be weighted differently from each other based on at least one of a) the performer of the specific performance transaction orb) the recipient of the specific performance transaction.

A user's specific performance transactions with other users may be aggregated, and a trustworthiness score may be generated as part of the user profile based on the aggregation of specific performance transactions.

The maintaining steps of the inventive method may be performed by a financial institution, and the financial institution may guarantee to the proposed recipient of a transaction that the proposed performer of a transaction is capable of performing the transaction prior to the transaction being finalized.

DETAILED DESCRIPTION OF THE INVENTION AND DRAWINGS

Description will now be given with reference to the attached FIGS. 1-11. It should be understood that these figures are exemplary in nature and in no way serve to limit the scope of the invention, which is defined by the claims appearing hereinbelow.

Figure 1:
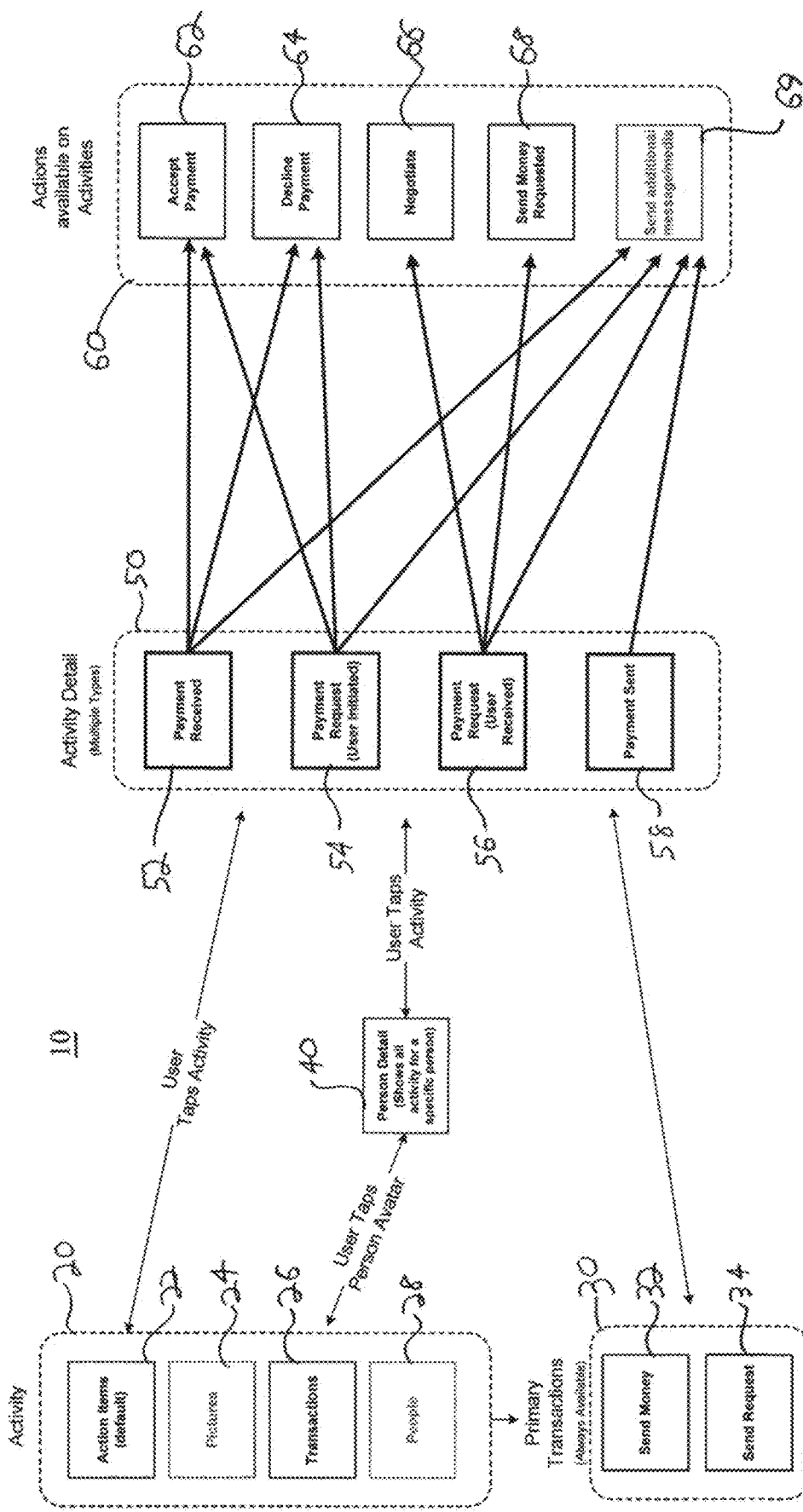
FIG. 1 is schematic overview flowchart of a system of creating and managing multivariant transactions having both financial and social components in accordance with the invention.

As shown schematically in overview in FIG. 1, the invention includes a system 10 for managing multivariant transactions having non-linear components, in which a non-linear non-financial variable is paired with a financial transaction. Conceptually, the main components of system 10 include resources and subsystems of one or more computers 100 (see FIG. 7 and description below) supporting and linking activities 20, primary transactions 30, user profiles 40, activity detail 50, and activity actions 60.

The activity module 20 includes action items 22 as a default screen/window serving as a portal for the user to the rest of the software. Pictures 24 is indicative of photos, videos, documents, and any and all digital media known or to be developed that users can upload, download, share, and otherwise associate with transactions, people, etc. Transaction module 26, described in more detail below in connection with primary transactions 30, enables the user to conduct business, both financial and social, with other users.

People 28 is indicative of a database of users. For a given user, people 28 might be all of his contacts or friends, or it might cast a wider net to incorporate multiple degrees of separation from the user as well (e.g., friends of friends, etc.). This is not an exclusive list; additional activities are contemplated.

Primary transactions 30 include a send money transaction 32 and a send request transaction 34. Both of these will be discussed in greater detail below. This is not an exclusive list; additional transactions are contemplated.

There are two exemplary mechanisms for a user to go from the activity module to the activity detail. In the first instance, the user can simply tap an activity in activity module 20. This takes the user to a specific activity screen, discussed below. In the second instance, the user can tap on a person 28 (e.g., that person's avatar) and access details 40 about that person to initiate an activity with that person. Another way to be discussed below that an activity can be accessed by a user is by selecting a transaction on the user's timeline. That will open a functional window similar to the window that opens upon selecting a person; that is, one can associate an activity with a timeline event/transaction as well as with people. Of course, since events often occur with other people, one can also access a person via an event (to be discussed below). Additional modalities are contemplated as well.

Activity detail 50 includes payment received detail 52, payment request by the user 54 (i.e., the user makes a request for payment of another person), payment request of the user 56 (i.e., the user receives a request for payment from another person), and a send payment action 58. Other activity details are also contemplated.

As shown in module 60, various activities/details have various actions available. For example, when a user receives payment at 52, she has the option of accepting payment at 62, declining payment at 64, and/or sending additional messages/media at 69. When a user requests payment at 54, she has the option of accepting payment at 62, declining payment at 64, and/or sending additional messages/media at 69. When a user receives a request for payment at 56, she has the option of negotiating for a different payment amount or for a specific performance task instead at 66, sending the requested amount at 68, and/or sending additional messages/media at 69. When a user sends payment at 58, she has the option of sending additional messages/media at 69. The sending of additional messages/media at 69 is one of the key aspects of the invention that enables what would be a simple one-dimensional financial transaction to become associated with and thus rich with multi-dimensional social context.

A. Adding Rich Social Context to the Transaction Experience

Step/modality 69 above enables a basic financial transaction to be augmented to include one or more informational quanta at least tangentially related to the transaction along with the transaction itself. Basic financial transactions include, and are not limited to, common credits and debits within a checking account, a prepaid card or a credit card account as a result of a payment vehicle such as a debit card, a personal check, a wire transfer, a person-to-person money transfer via Automated Clearing House (ACH) network, etc. or even a cash deposit or withdrawal via ATM or a bank teller.

Figure 2:
FIG. 2 is a schematic of a screenshot of a thank-you style note function paired with a payment via a system in accordance with the invention.

Such related informational quanta might include a thank you note-type communication from the recipient to the sender. An exemplary such communication is depicted in FIG. 2 as message 70. Here, the user is notified that she has received a payment of $50 from Jon M, as with many conventional payment systems. However, this message 70 also includes a nice note from Jon M. thanking the user for the money in order to buy a new hat, as well as a cartoon of Jon wearing the hat. The user may then respond with another message or view this transaction on her timeline (discussed below).

In addition to the cartoon and text, the message 70 can include audio/video recordings from the recipient to the sender about the received item or experience. In the case of a received experience, e.g., tickets to an event, these could include clips of the event (e.g., portions of a song being played by the band at a concert, photos of the actors on a stage or fellow audience members, etc.), photos of the surroundings (e.g., the sunset that evening, the venue, etc.); text messages and social media posts about the transaction, received item, or experience that are automatically retrieved without the person having to manually associate relevant content; time, weather, venue and geo-location content related to the item or event; photos of the item or of the recipient using the item.

Figure 3:
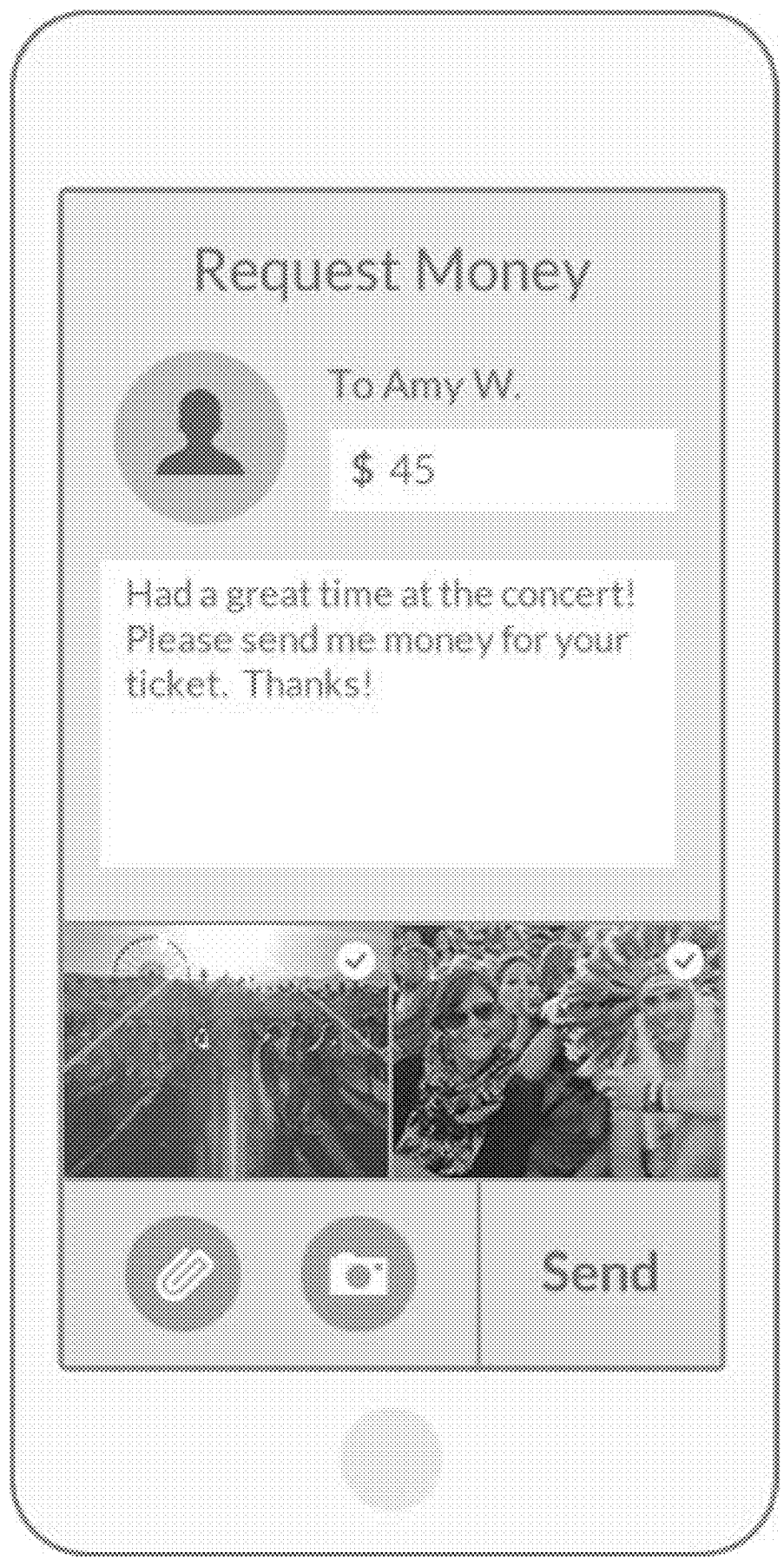
FIG. 3 is a schematic of a screenshot of a request for payment function paired with social components via a system in accordance with the invention.

FIG. 3 is an exemplary transaction 72 including a number of these related informational social quanta. Here, the user is requesting $45 from Amy W. (another person). However, instead of simply asking for the money in a one-dimensional transaction, the request transaction 72 in FIG. 3 includes a note and two photos from the event for which the money is being requested. Additional media (e.g., a file or a photo) can be attached via the paper clip and camera buttons.

In any of the above non-limiting examples, after the recipient sends related informational quanta to the sender, the sender can send other related informational quanta back to the recipient, in the form of a conversation. This transaction/conversation can be ephemeral, like a SnapChat photograph, or it can be stored in a journal or record, either integrally with a user's social media account or separately in a discreet app, system, or environment. As with any communication, the record of the transaction can be made as public or as private as the participant's desire via various levels of privacy settings. Multiple transactions can be accumulated to create a trustworthiness "credit score" as described in more detail below. Different privacy settings may be provided based on life milestones or managed dates. For example, someone might allow for certain transactions to be shared after they die with their spouse or children, allowing their legacy to live on and be shared downstream.

The identification, retrieval, and association of informational quanta associated with the transactional record is executed on an automatic basis, delivering a key customer value in the removal of a repetitive, tedious, and manually taxing manual process. Further, the aggregation of this important social context allows customers to access these quanta historically and share them at later dates with the same relevant group of people or with others new to the event/transaction.

B. Expanding the Universe of Transactions to Include Non-Monetary Social Obligations In addition to adding social context to financial transactions, the invention also expands the fields of participants and scope of what can be transacted.

Figure 4:
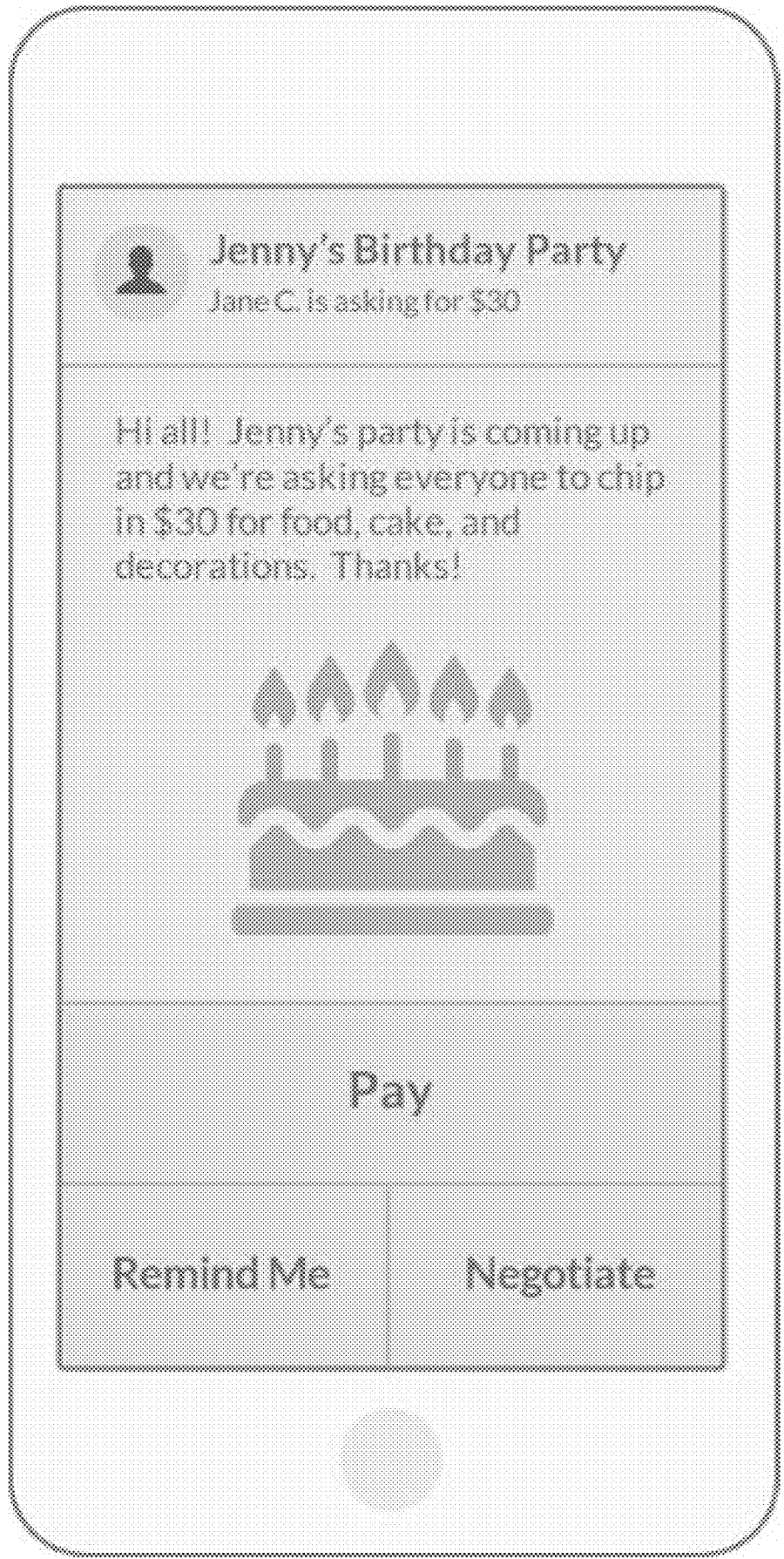
FIG. 4 is a schematic of a screenshot of a multiple person transaction function made via a system in accordance with the invention.

In one aspect of the invention, the invention enables the number of participants to a transaction to increase beyond the conventional two people. Instead of simply limiting transactions to being between two people, the invention contemplates group transactions, such as soliciting a number of friends for a collection, e.g., for someone's birthday. One such exemplary screenshot 74 is shown in FIG. 4. Like the Request Money screen of FIG. 3, the multiple participant transaction reflected in FIG. 4 is a request for funds. Here, however, the sender (Jane C.) is asking a number of people for funds to contribute to Jenny's birthday party. The screen shown is on the device of one of the multiple recipients of the solicitation. The recipient has the option to pay the requested amount, table the request until a later time, or negotiate the transaction.

Figure 5:
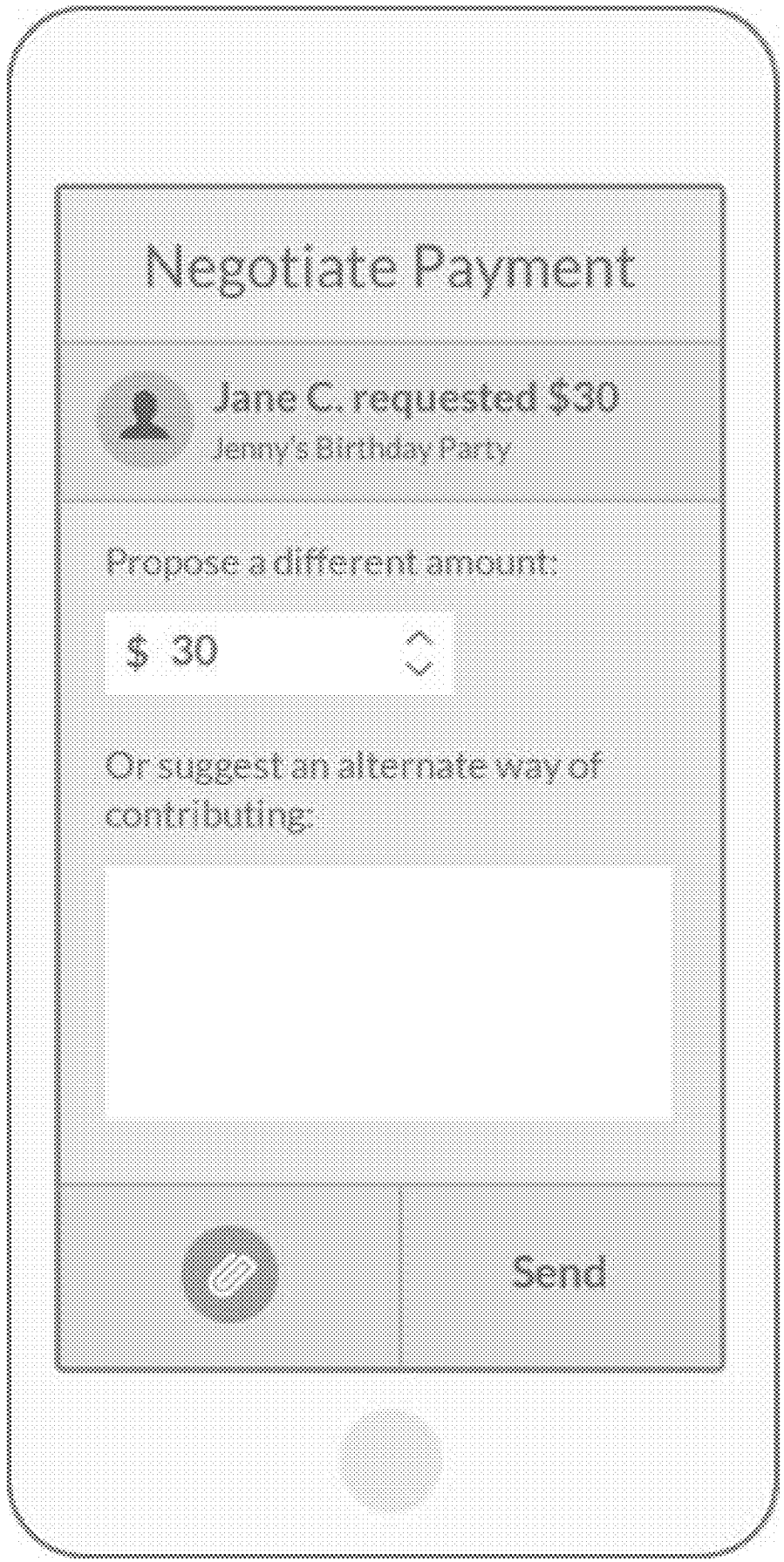
FIG. 5 is a schematic of a screenshot of a negotiation of a payment function via a system in accordance with the invention.
Figure 6:
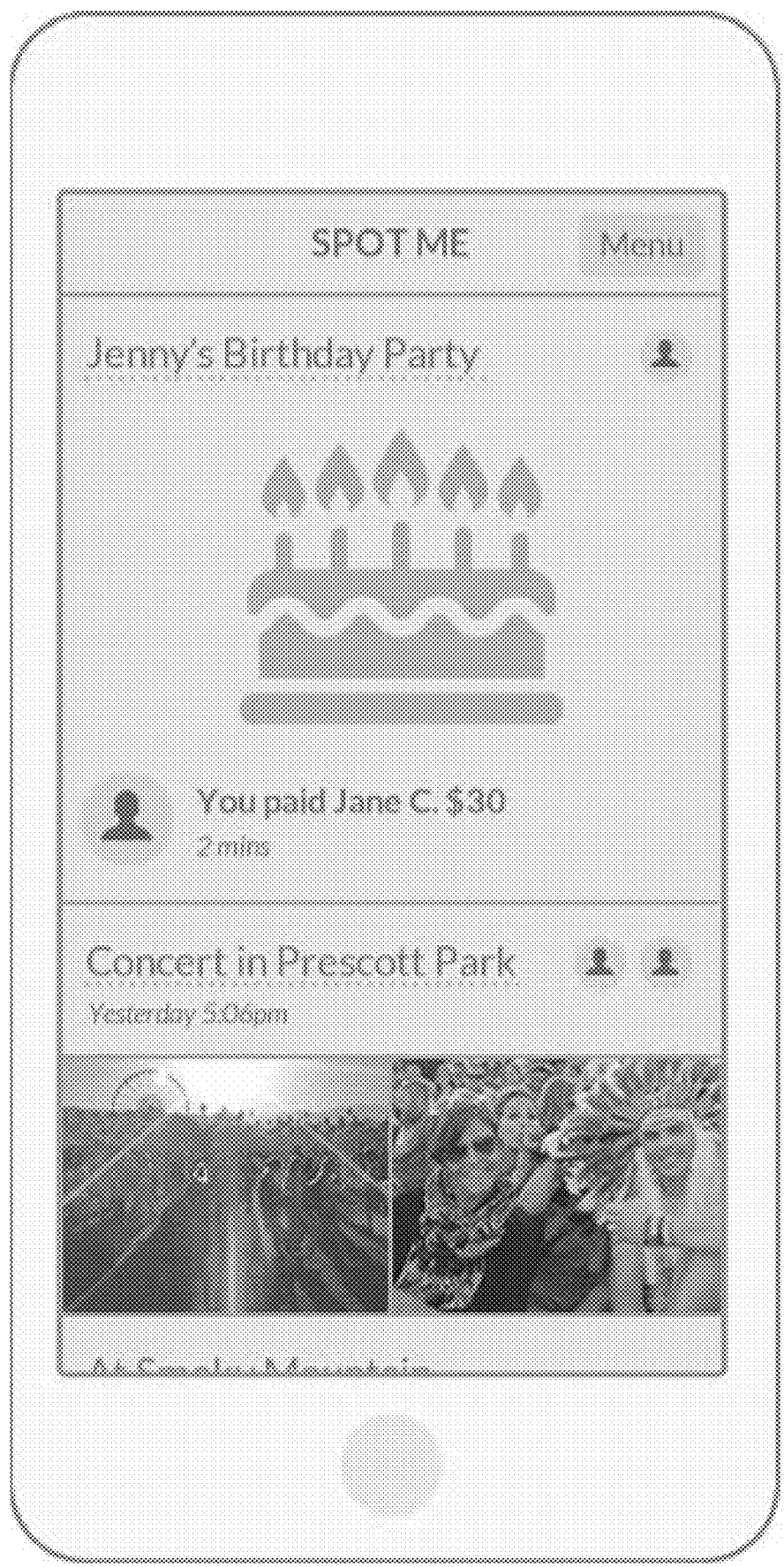
FIG. 6 is a schematic of a screenshot of a financial-social transactional timeline made via a system in accordance with the invention.

FIG. 5 depicts an exemplary screenshot 76 of the negotiation function of the system. Upon selecting the "Negotiate" button of FIG. 4, the screenshot 76 of FIG. 5 (or something similar) is presented to the recipient of the solicitation. Here, the user can select a different amount of money to send back to the requester, either more or less than the requested amount. In addition or in the alternative, the user can negotiate a non-monetary contribution, such as an act (e.g., driving people to the party) or omission of an act (e.g., not drinking during the party so as to be a designated driver). Other options for negotiation may include changing the payback date or paying in installments. To be clear, it is contemplated that the negotiation feature is available as a response to any transaction, not merely to a group request.

The invention also includes a digital obligation manager. It is often a thankless job to organize an event and serve as the collector of group member obligations (making sure everyone makes good on their commitment—financial or otherwise). Further, individual personalities, sensitive circumstances, and social group dynamics can create friction between the one who asks and the one(s) who owe(s). This invention contemplates a digital manager that serves as the collector of obligations to eliminate the interpersonal friction. Based on the settings of the group organizer(s)/admin(s), the digital manager can also display to all group members the status of obligations to apply social pressure to those who are not owning up to obligations without directing the ensuing angst towards a human manager/organizer. Disapproval from a group—especially public disapproval from a group—is a more powerful motivator than private disapproval from an individual. The digital manager can also generate automated reminders.

The digital manager can also be configured to apply social pressure during times that are most relevant for the recipient. Based on an ability to understand the recipient's schedule, notifications would be presented at maximum potential of being acted on based on another learning system. Relevant notifications can be presented at relevant times based on what the person is doing, e.g., if they are standing around waiting to check out, it might be a great time to receive an alert. If the person who owes money is coming in close proximity to the person who lent them money, the system can remind one or both of them before the encounter. Calendar integration can enable the system to remind them to prepare to repay the lender before the meeting takes place.

Expanding on the concept mentioned above of providing a service instead of a monetary payment, the invention contemplates the exchange of favors (babysitting other couples' kids, cooking a meal, performing a task such as gardening, snow removal, etc.) while tying these into a similar financial transaction record-keeping function provided by a financial institution. Favors need not all be on a one-to-one level of equivalence. E.g., one person cooking dinner is worth three driveway snow shovelings from another person, babysitting one person's kids is worth four times the value of babysitting someone else's kids, etc. These favors can be exchanged directly or banked via a virtual coupon book so that the recipient can cash in favors at a later date. Also, the invention contemplates the automatic ability to serve up the "balance" of favors associated with an individual linked via social media tools or digital contact management solutions. For example, in choosing to post a social media comment or send a text to a friend, the favor balance is retrieved to serve as a memory aid while in the context of the digital conversation (i.e.—I need to pick up the tab at lunch next time).

A database of favors is contemplated as storing these non-monetary transactions. In one aspect, non-monetary transactions are preferably assigned a score or point value so that an even exchange can be made amongst various participants. For example, babysitting one child might be worth "10 points", but babysitting twins might be worth "25 points." In addition to base point levels being assignable by the digital obligation manager, a group of participants may optionally be giving the ability to override and edit such base levels according to one or more factors. Going back to the babysitting example, babysitting one child might be only 10 points because the child is 11 years old and easy to manage, while babysitting someone else's child might be worth 20 points because they are known in the social group as particularly spirited and willful. As another example, giving people rides may have a base value that can be adjusted by time of day, distance being driven, distance out of the way of the driver, and many other factors. In addition or the alternative to a points-based system, favors can be assigned more broadly to one of several tiers of favors. For example, getting a ride down the street might be a Tier I favor, while getting a ride to the airport might be a Tier III favor. Again, as above, the tier assignment of a particular favor can be designated by the digital obligation manager and/or by the participating members of the group. Favors might even be given out in the future as prepaid favor digital or physical cards to be cashed in at a later time and reloaded as needed. Moreover, one might also want to share one's favor currency with someone else, whether you know them or not in exchange for goods as services. If one has accumulated favors with someone who everyone else needs favors from, one could use the platform to exchange those favors in for something else of value.

C. Expanding the Set of People with Whom One can Transact

Just as the number of people involved in a transaction can be increased, the invention contemplates enabling other individuals beside the initially requested person to get in on the action. As an example, if person A asks person B to wash A's car, person C (a friend of B) might see this request on social media or on a dedicated network and offer to wash the car instead. A can accept or decline C's offer, of course, however knowing that C is a friend of B makes B more trustworthy to A than a total stranger. Different degrees of trustworthiness can be established by any of the following variables: degrees of separation from the solicitor, quality of the intervening relationships to the solicitor (e.g., A to B), quality of the intervening relationships to the offeror (e.g., B to C), and the like. Past transactional payment/completion history will also be factor. The number of relationships that C has with multiple people might also increase C's rating.

Over time, members of the community can develop a trustworthiness rating (similar to that of eBay or Amazon) in carrying out promised actions or paying debts, referable to as "fiscal karma." When combined with the abovementioned journal or record of transactions and digital/automated manager of same, participants can create an entirely new type of credit score within the system/environment. Ratings can be assignable to participants on a tiered spectrum to encourage best payment/repayment practices. For example, someone can be labeled a "lousy mooch" at the low end of the scale, "saintly philanthropist" at the other end of the scale, and varying other tiers there between. This will allow participants to be able to get a sense of the trustworthiness of other participants that they might not know directly but only through one or more degrees of relation/separation. One or more icons or indicia can be associated with one or more variables of fiscal karma. E.g., different colors, shapes, symbols, numerical ratings, letter grades, etc. can be indicative of how well the person pays someone back, how quickly the person typically pays someone back, to how many people the person owes money/favors, and the like. An example of these indicia is described below.

D. Tying the Universe of Transactions Along with the Related Set of People into the Record Keeping and Payment Facilitation of a Financial Institution Another way that trustworthiness of participants can be enhanced is by linking them to a trusted financial institution. A trusted financial institution member agreeing to pay a certain amount of money is more trustworthy than someone simply sending an SMS message to that effect, particularly if the financial institution guarantees the transaction in one form or another. As an example, the inventive system can prevent a member from making promises s/he cannot keep, e.g., corroborating that the requested payment is less than the balance in the person's liquid account, or below a pre-set threshold set by a custodian of the account (parent, adult child of elder parent, spouse, guardian, etc.). In the case of non-financial transactions, the system can confirm that the requested action does not conflict with the proposed actor's existing calendar/schedule. Additionally, the system would allow you to keep record of these transactions that otherwise would not have a paper trail or record at a trusted institution. The favor database and digital obligation manager can both be run by a trusted financial institution, for example.

The trusted institution provides a safe, secured, and lasting place for this information to be housed. As social networks and cloud storage companies come and go, one's memories will be protected by the same people who protect one's money. In addition, money can be transferred into accounts (retirements, trusts, college funds) with the social context intended at the time of the depositor. For example, while saving for a child's college fund, notes can be added (things that happened that week, why one is saving for their college, etc.). Upon transfer or usage of that account, that context can also be shared. Even if the depositor does not remember the reasons behind the deposits (or is since deceased), the recipient will have wonderful reminders. In the case of retirement accounts, the depositor and recipient can be the same person, and social context can include reminders as to why the future retiree is saving the money. In the case of trust or college funds, transactions can be put into a dedicated fund with social context that is also received when the funds are used (e.g., parent storing memories of child's life as they save money for college, child receives the funds and the "memories" upon graduation).

Also, inanimate yet connected items can provide information to the system. The "Internet of things" (connections across platforms) can also feed data into this historical information. For example, one's house can tell the institution how much electricity was used for the electrical bill, etc. The historical transactional data is an element that social networks that are "making payments social" do not have the luxury of having and would have to import from a bank. Information gathered through the information broker could also exist as long as desired with renew dates option possible. Users might want to share some memories across generations, families, etc. Grouped transactions can also be used as templates for others to follow and have the same success, experience, etc. For example, someone might have clout as a travel expert, and others would want to simulate experiences similar to the expert. Their experience, with permission, could be shared as a group of transactions that could further be customized for the intended or by the intended.

Along with the traditional banking service of keeping money safe and providing access funds, the financial institution will also house non-monetary social obligations and provide access to those who are associated with the transaction. Access will include functions and features mentioned above in Section B. Housing the universe of transactions in a financial institution is an important value component, as these entities are federally regulated; therefore, they are obligated to ensure the safety and soundness of the banking system. This explicit commitment to preserving the stability of the financial system separates banks from social media companies and provides a more trustworthy foundation from which to provide these services.

E. Platform Agnostic and Universally Accessible in the Digital Realm

The above system is only as good as its reach; ideally, it should be usable both inside and outside of a given financial institution, enabling the exchange of money/favors with anyone, in any digital environment. To this end, the system includes the following features: 1) seamless single sign-on to multiple apps/software; and 2) universal payment interface.

1. Single Seamless Sign-on

At least two mechanisms are contemplated to effectuate as simple a user experience as possible. The first involves the aggregation of login/password combinations to facilitate a participant's entry into his/her various financial accounts and provide significant personally identifiable information such that in order to create a user at a new provider the user would not have to provide any information other than login and password. Existing account aggregation strategies (e.g., Yodlee) can be used to avoid the participant being forced to create a username and password and provide significant personally identifiable information. An overall user profile, created once, can be implemented to allow access to a multitude of participating financial services, Or any institution's login information can be used to create a registration information for any other organization.

The second involves not delivering the requisite apps per se to the user's device but serving those apps to the device and emulating them thereon. The user is then required only to download and install a basic framework app in which all other apps will be running via a remote (e.g., a trusted institution or enterprise) server. This approach accomplishes a number of improvements. First, it reduces the amount of data the user must download. Instead of downloading many apps that are tens or hundreds of megabytes large, the user must only download one relatively small framework app. Second, it ensures that the apps are constantly updated for security and functionality purposes, as they would be updated by the trusted institution/enterprise once, rather than by each user on his/her respective device (which may or may not occur). Additionally, apps can be customized and branded to provide a unified look and feel to the user, all coming from a single source, rather than a hodgepodge of disparate apps developed by different sources. Moreover, it reduces app development cost by avoiding multiple versions for different operating systems. There would not need to be different versions of the various apps for iOS, Android, etc., since they would be running solely on the trusted institution/ enterprise servers and emulated locally on the users' devices. The framework app would be different for different operating systems, but the underlying apps that will run therein can be the same regardless of the user's device.

2. Universal Payment Interface

It is generally difficult to send and receive peer to peer payments via mobile devices. Typically, this process requires a specific app or website. Both sender and receiver must sign up with a service and provide personal information, obviously including financial institution information.

A feature of the system includes a universal payment interface, such as a custom in-app keyboard. The keyboard can be used to specify the amount of money one user wants to send to another user. Activating the "pay" or "send" feature will cause the creation of a unique one-time URL to be shared as text in any application (SMS, Facebook, SnapChat, etc.). The URL can include a single use token, a unique user ID, and other relevant information. A URL for sending funds is preferably unique per transaction. A URL for receiving funds need only be unique per user. When the sender sends the text, the receiver uses the link to the URL to access a website or app to receive or send the payment, be it a receive URL or a pay URL. The receiver is not required to enroll into a service and does not have to enter any personally identifiable information, financial institution information, or the like. All the receiver needs do is identify payment information such as the routing number, debit or credit card number, phone number, gift card information, etc.

Both of the above features of seamless single sign-on and universal payment interface, either together or separately, will allow users to exchange money in any digital environment, both within and external to the trusted institution/ enterprise.

F. Transaction History Expressed as a Social Timeline

Adding the rich social context and non-monetary transactions sets the stage for a display of this information in an engaging timeline format that delivers new opportunities to recall meaningful historical context and share with others in the present and future. An example of such timeline is shown as timeline 78 in FIG. 6 and is described below in the use scenarios in connection with FIG. 9. One feature of such timeline is the ability to see transaction history broadly or with a specific person. One can quickly see the context of one's history with a specific person over time and place (i.e.—my husband and I went to Singapore). The evolved reliving of those memories might generate conversation/ comments/feedback on past transactions by the account holder or people transacted with, creating a new place to have a conversation.

Another feature of the timeline is the ability to review one's budget with additional context (pictures of the events/ purchases/experiences) weighed with the cost, location, weather, time, frequency, etc.

Another timeline feature is the ability to share one's transaction history with others based on filtered criteria. One can share specific memories of events with people (either so they could experience the same memory/transaction/itinerary) either physically executing the same transaction or just by reliving the memory. At the end of one's life, when everything is virtually represented, one's memories will not die but can be shared in different capacities with trusted others.

Another timeline feature is the use of historical information to create smart reminders. For example, the system can analyze one's transaction history and ask "you always make these purchases near Mother's Day, do you want to make the same purchases this year?" Similar reminders/messages may include factoring in the number of vacations one took last year (or trended over many years) into one's budget for this year; spending analyses comparing how one lives now and how short of that lifestyle one's current savings for retirement will be towards living that way in the future; and others. Similarly, historical information can be used to trend transactions over time based on smart data needs. For example, one can discover that one is always sick around a certain time of the year. The system can provide preventative care information (that might also later feed into the institution's health care solutions) as a determinate/factor into health insurance and life insurance. Similarly, data can be trended over time of day/month/year. Not only can one see how one spends this month or every month, or that at certain times of the month there are spikes in savings/spending, but the institution or third parties can make personalized offers to the participant based on such trended data. Historical transaction information can also be used to trend across years. Understanding how many vacations the person pays for, on average per year could help determine how much and win savings should be allocated all the way up through retirement fund planning so that it would be even more accurate.

Another timeline feature is a map view of the transaction—to be able to see these are all the places one went on a trip, these are restaurants one ate at last time, etc.

The timeline view enables one to review one's life not in terms of transactions made but experiences. One can quickly review with whom one transacts a lot and determine if those people are the people on whom one really wants to focus one's time and money. Conversely, one can judge if the purchases were worth it based on their respective social contextualization. This can allow the budgeter to determine if the purchase was worth it or if they want help preventing similar purchases in the future. Additional context could also be presented in a way that allows conversations/discussions to have more transparency. Solutions can be displayed in a way to help facilitate discussions on finances (amongst users, between the user and the institution, etc.) that might previously been hard to start off objectively.

As an added benefit, helping to create and review memories can potentially and physically help people live improved lives—the amount of memories one creates before one turns 30 helps determine how one's brain will age. If it is physically easier for participants to build memories, they will have more memories to leverage looking back on their life.

Some of the benefits of the timeline to the user have been explored, however the timeline also provides benefits to the financial institution hosting the timeline as well. It provides additional context of the transaction that the institution never had before that can be used not only to create a more personalized experience but also to create information for marketing and external third party companies. It enables companies to become more personal as well; one is no longer reviewing transactions one had with companies but experiences that one enjoyed with or at them that companies can also leverage as well. As an example, pictures taken of detailed yard work could serve as reminders to the customer this is what I am paying for (that can also be shared with others) and by the company (this customer appreciates the work being performed—continuously driving up the quality of the work).

Figure 7:
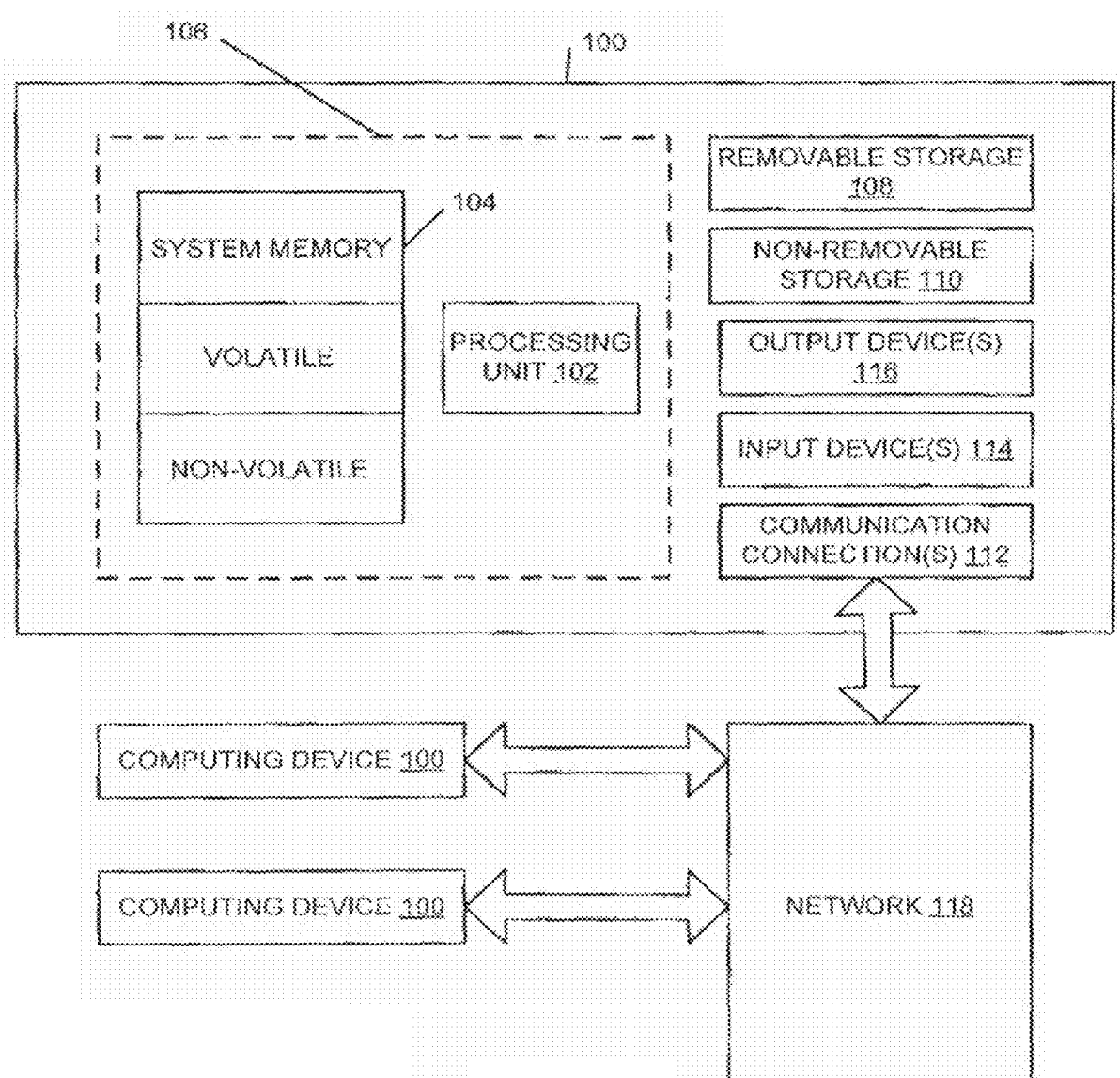
FIG. 7 is a block diagram of an exemplary computing environment within which various embodiments of the invention may be implemented.

FIG. 7 depicts an exemplary computing environment in which various embodiments of the invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 7 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 7 by removable storage 108 and non-removable storage 110.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 inter-connected by a network 118, as is shown in FIG. 7. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as USB flash drives, SD cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

In operation, the invention can be utilized as demonstrated in the series of functional screenshots of FIGS. 8-11.

FIGS. 8A-E depict a series of screenshots on a computing device such as a smartphone for making a payment in system 10.

Figure 8B:
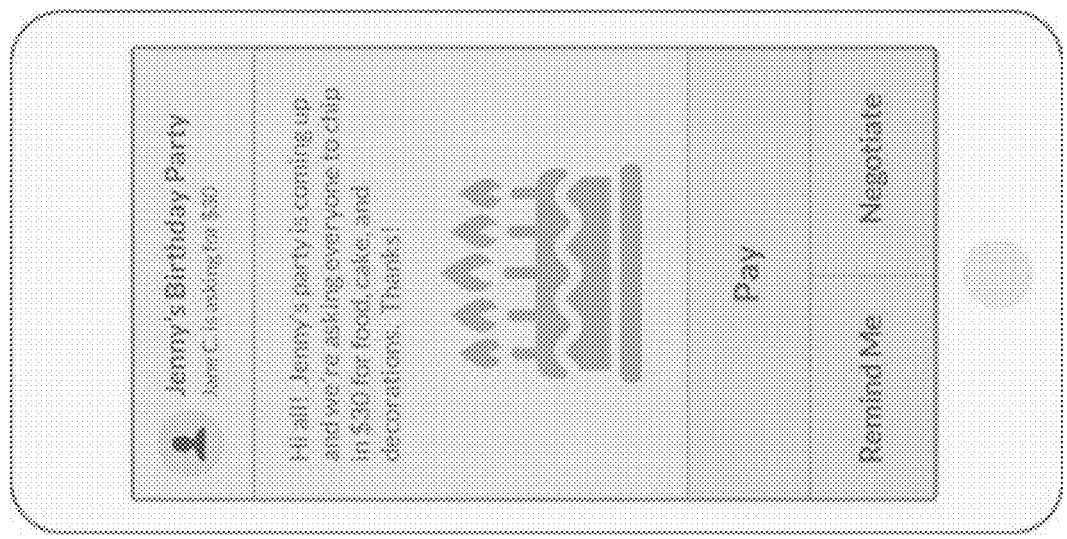
FIGS. 8A-E are a series of schematics of screenshots illustrating a transaction via one of several routes made via a system in accordance with the invention.
Figure 8A:
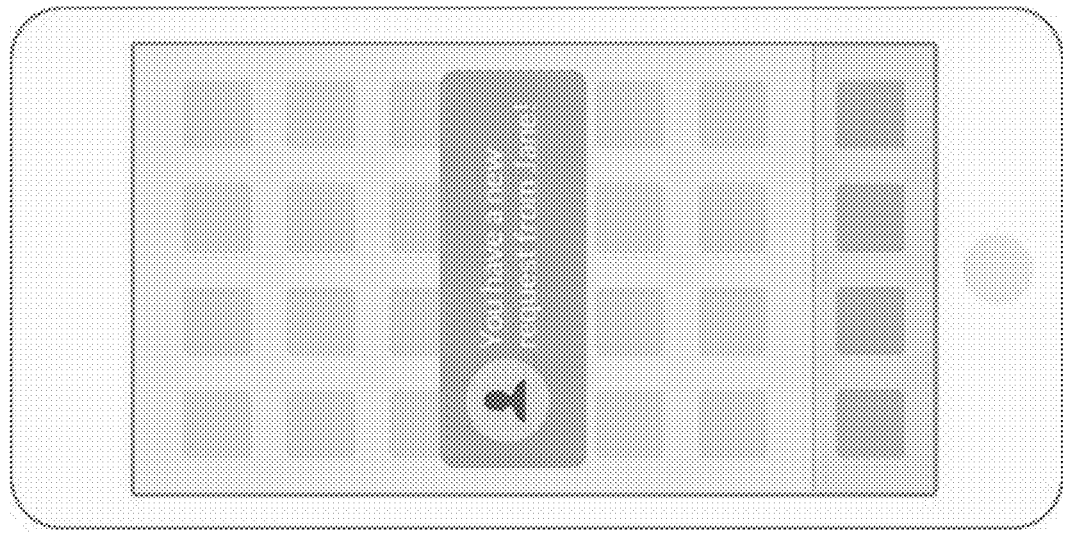

In FIG. 8A, atop the person's home screen, a notification window pops up indicating that the recipient has a new request from another participant. As discussed above, this request could be in the form of a payment, a request for a specific task, or one or more other categories. In the case of FIG. 8A, it is a request for payment.

As noted in FIG. 8B, Jane C. is soliciting funds from multiple people for an upcoming event (Jenny's birthday). The message of FIG. 8B is being sent to multiple people, hence the "Hi all!" salutation. In response, the recipient has three functional options (other than hitting the home screen button and ignoring it entirely): pay the requested amount via the "Pay" button, table the request for a later time via the "Remind Me" button, or offer a different amount than the amount requested via the "Negotiate" button.

Figure 8D:
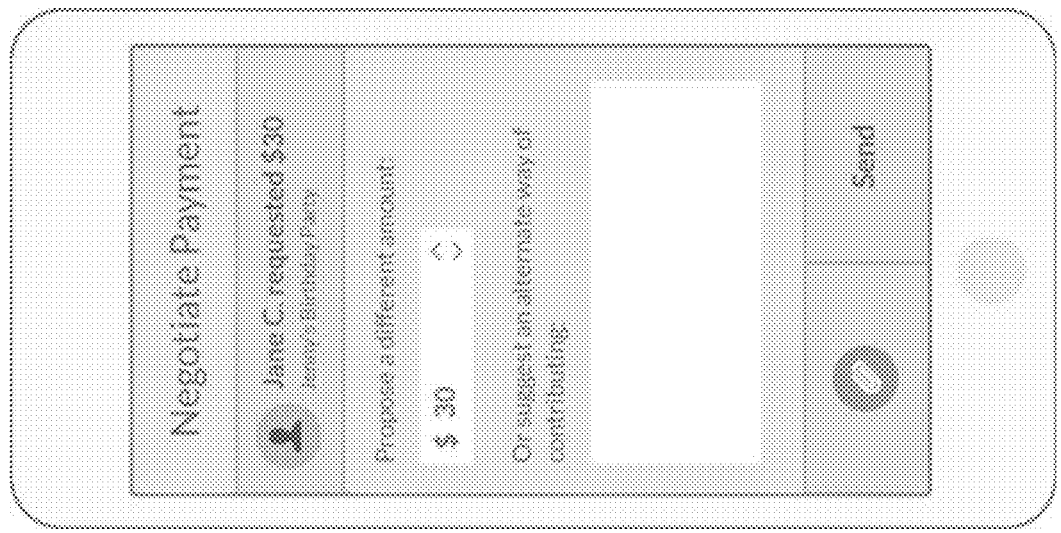
Figure 8C:
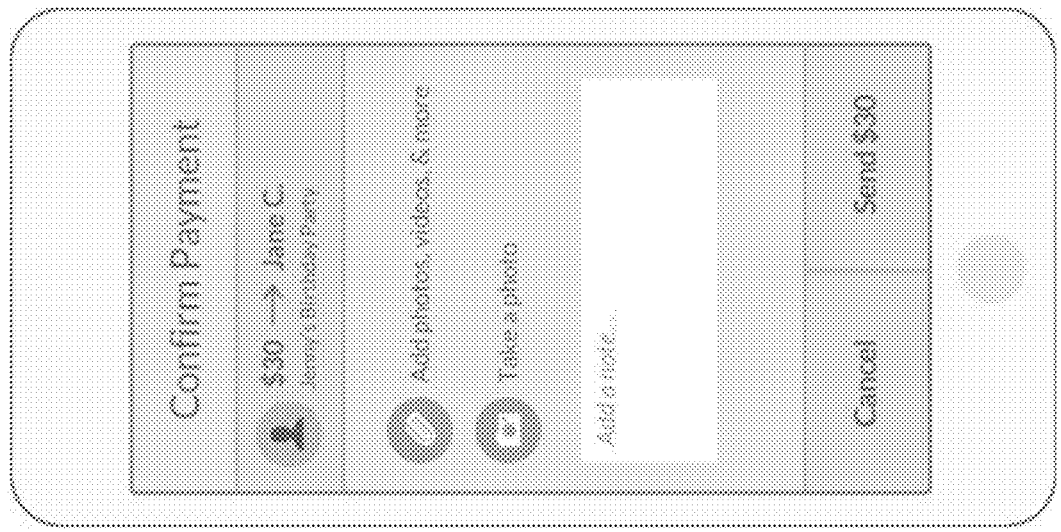

In FIG. 8C, the participant has selected the "Pay" button, and the action of sending $30 to Jane C. for Jenny's birthday party is indicated. One is able to add photos, text, or any other form of social context for this transaction, thereby linking the payment of $30 to Jane C. contextually to the event, to the way the payer feels about Jenny (e.g., delighted to pay, grudgingly participating, etc.), to the way the payer feels about birthdays in general, etc.

In the alternative, the participant may instead select the "Negotiate" button, and the screen of FIG. 8D appears. At least two fillable fields are offered: the monetary amount field, and the text field. In the monetary amount field, one is given the ability to increment or decrement the amount requested and either offer more or less money than the requested amount. In addition or in the alternative, one can add text to the text field to suggest a specific performance option rather than money. In the case of Jenny's birthday, the recipient of the request may instead offer to bring his band and play at the event, or be the designated driver and pick up and drop off some/all of the participants, or the like. As before, photos, video, other digital files can be attached to this leg of the transaction via the paper clip button.

Figure 8E:
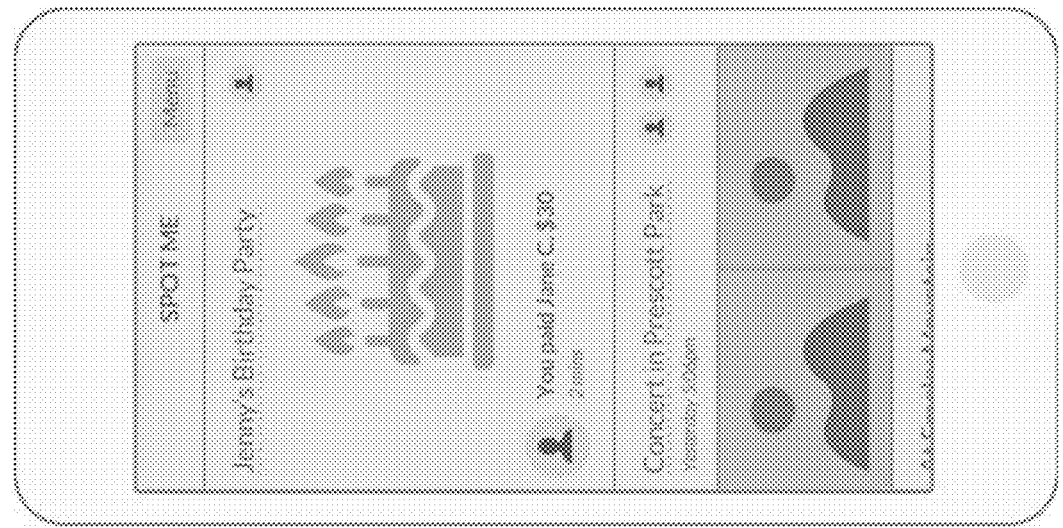

As shown in FIG. 8E, the request recipient knuckled under to the request and paid Jane C. the requested $30. FIG. 8E is a view of the timeline of the participant showing the payment of $30 to Jane C. with a time stamp. As one scrolls through one's timeline, one would see the payment in connection with Jenny's birthday and remember a) there is a party to go to, b) how the participant feels about Jenny, c) how the participant feels about birthdays, and many other aspects to the transaction. A simple financial transaction has thus become a multivariant transaction having both financial and social aspects.

Figure 9:
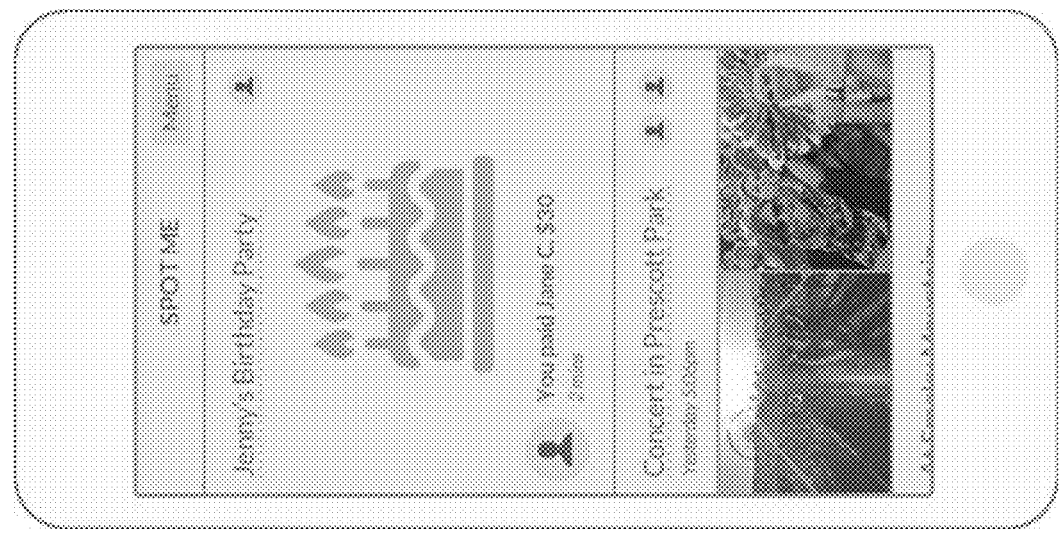
FIG. 9 is a schematic of a screenshot illustrating a financial-social transactional timeline made via a system in accordance with the invention.

FIG. 9 is another depiction of the participant's timeline. In this depiction, photos have been uploaded in connection with the event "Concert in Prescott Park." The photos may have been uploaded by the owner of the phone depicted or by another participant connected with the event.

Figure 10B:
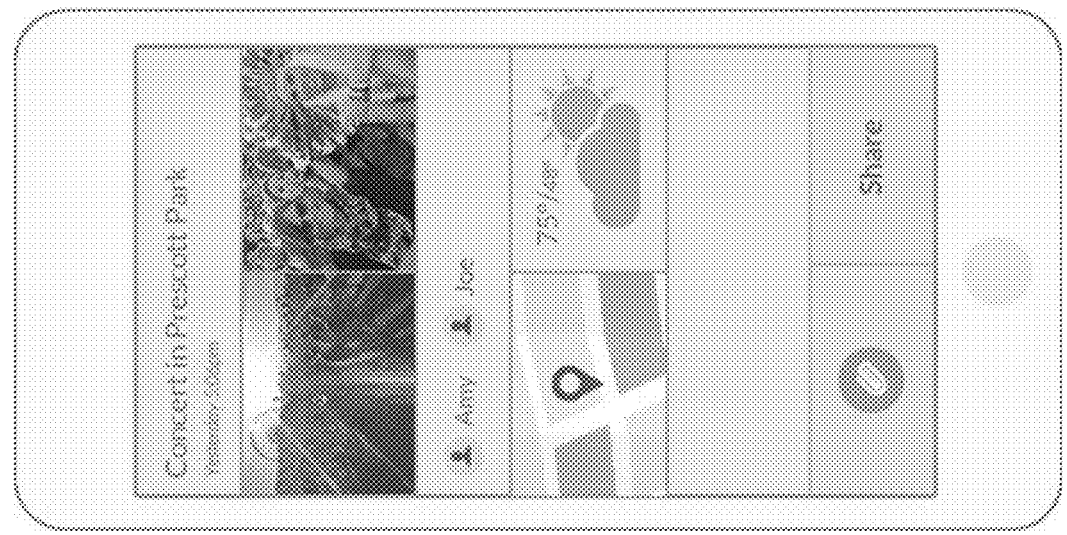
FIGS. 10A-H are a series of schematics of screenshots illustrating an association of a financial transaction with a social event via a system in accordance with the invention.
Figure 10A:
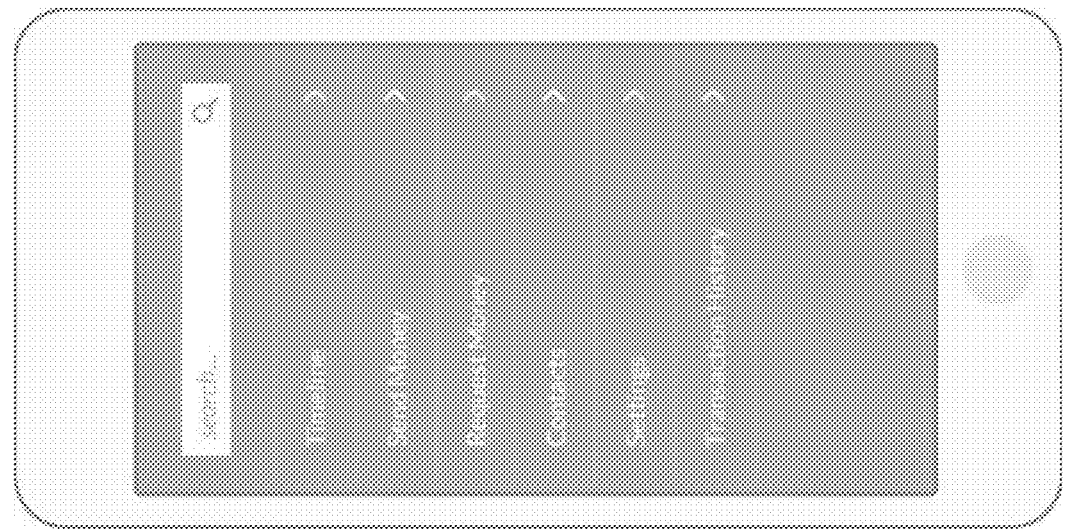

FIGS. 10A-H depict a series of screenshots on a computing device such as a smartphone for requesting a payment in system 10. An initial home screen is depicted in FIG. 10A with a variety of selectable functions: timeline, send money, request money, contacts, settings, and transaction history. In this case, the user may select "timeline" and be brought to the timeline screen of FIG. 10B. On the timeline, an event "Concert in Prescott Park" is depicted, with photos, a map, the weather, and the indicator that the event was attended or somehow associated with two other users, Amy and Joe. At this point, the user is reminded that he laid out the money for Amy's concert ticket and would like to be reimbursed. The user can do this one of several ways discussed below.

Figure 10D:
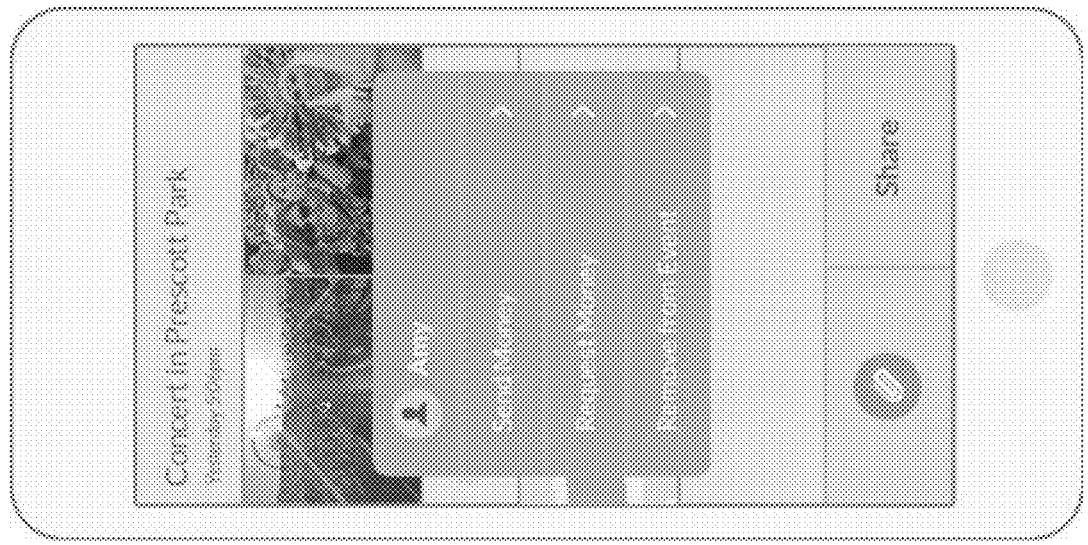
Figure 10C:
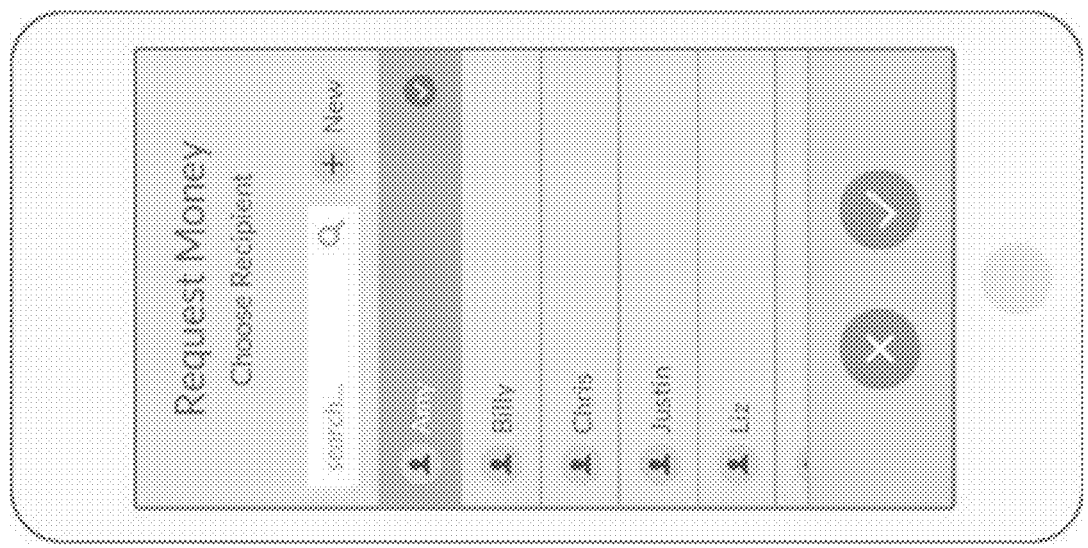
Figure 10F:
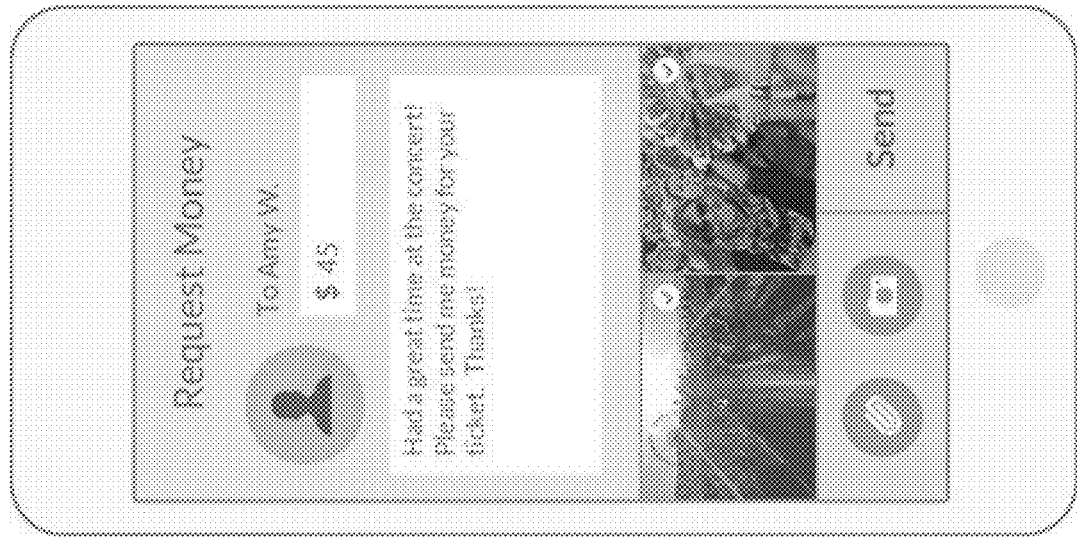

In FIG. 10C, the user has gone to a "Request Money" screen e.g., via the "Request Money" button in FIG. 10A. The user can select "Amy" from a number of other users, either from a complete list of the participant's contacts, a list of people with a particular association (e.g., also attended the concert), or some other parsing scheme. In the alternative, the user has selected "Amy" from the timeline view of FIG. 10B. An Amy window pops up with a number of choices for further action. "Request Money" is one of them.

Figure 10E:
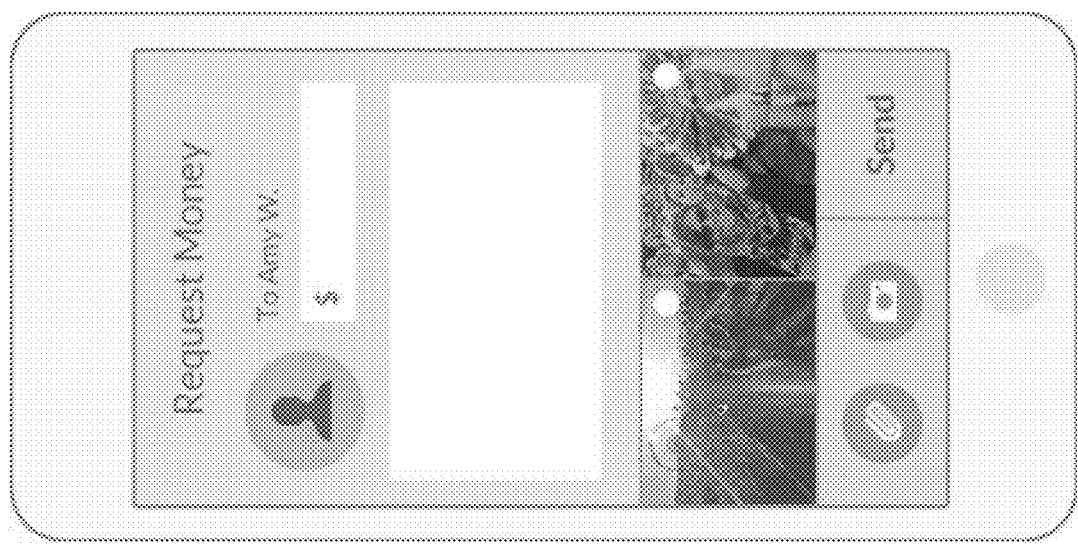
Figure 10H:
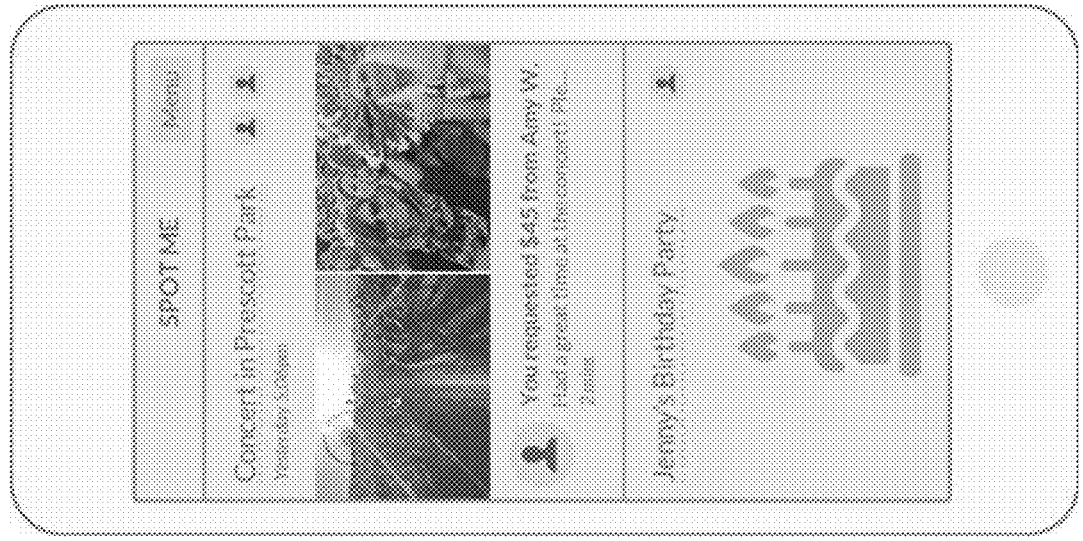
Figure 10G:
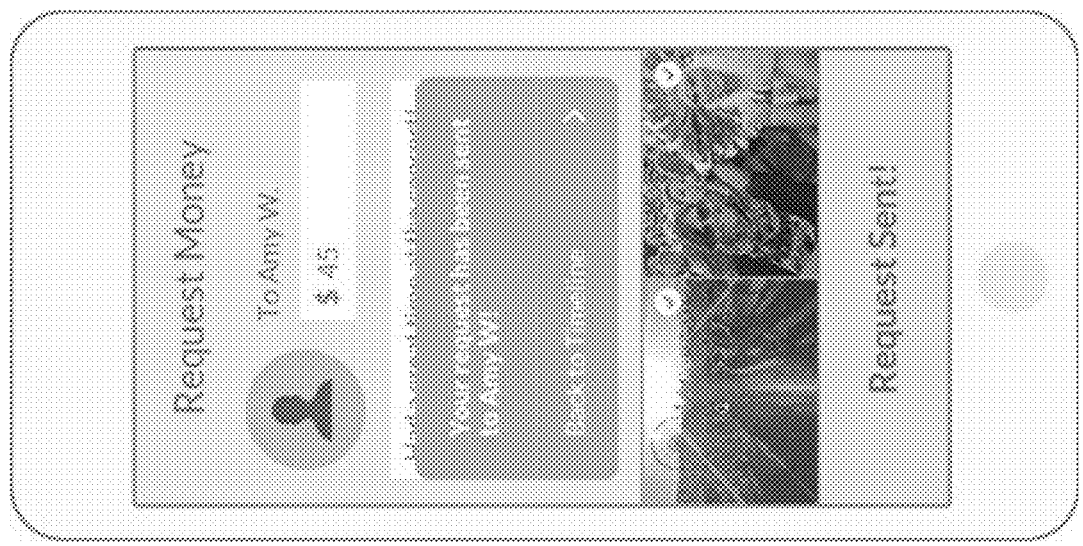

Selecting either "Amy" in FIG. 10C or "Request Money" from FIG. 10D will take the user to the Request Money screen of FIG. 10E. Here, because the concert photos are already uploaded to the screen, it is more likely the user arrived at the FIG. 10E screen via the timeline event. However, it is also possible that the user uploaded the concert photos again after arriving via the Request Money screen of FIG. 10C. In any event, the user fills in the monetary amount along with a note in FIG. 10F. There are check marks on the photos in FIG. 10F, indicating that the user has selected these photos to be sent along with the request for money. In this way, as above, a simple financial transaction has thus become a multivariant transaction having both financial and social aspects. Upon pressing the "Send" button in FIG. 10F, a confirmation window optionally pops up as shown in FIG. 10G, in addition or in the alternative to the words "Request Sent!" appearing at the bottom of the screen. Upon returning to the timeline in FIG. 10H, the event "Concert in Prescott Park" has been updated to reflect the request for payment from Amy W.

In the abovementioned FIGS. 10A-H, Amy W. is represented by a logo consisting of a circle with a person's head and shoulders therein. As with conventional social media, the logo could be replaced by an avatar, a photo, or the like. Unlike other social media, however, the logo can include one or more indicia of trustworthiness connected to the person it represents. As discussed above, the inventive system can generate a "fiscal karma" score indicative of the trustworthiness of the person. Various factors can go into one's fiscal karma score, including how quickly one pays one's debts; how many outstanding debts one has; how generous one is in making payments or loaning money or service; or the like. The logo can be of different colors for different levels of trustworthiness, or of different shapes, images, etc. The logo can have multiple different types of indicia each corresponding to a different aspect of one's fiscal karma. Or, it could simply be a single variable along a scale. As a nonlimiting example, a border around the logo/avatar could range from violet (very trustworthy) to red (very untrustworthy) with the entire visible spectrum therebetween. As another example, a letter or number grade can be assigned to the user to represent a score or one or more tiers of trustworthiness.

Figure 11B:
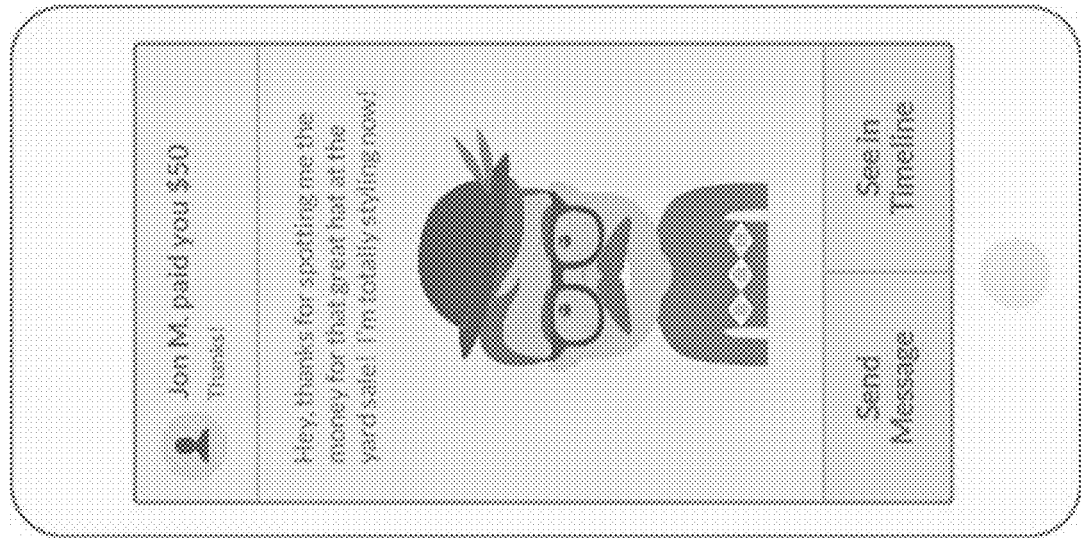
FIGS. 11A-C a series of schematics of screenshots illustrating a money-reception transaction tied to a social variable made via a system in accordance with the invention.
Figure 11A:
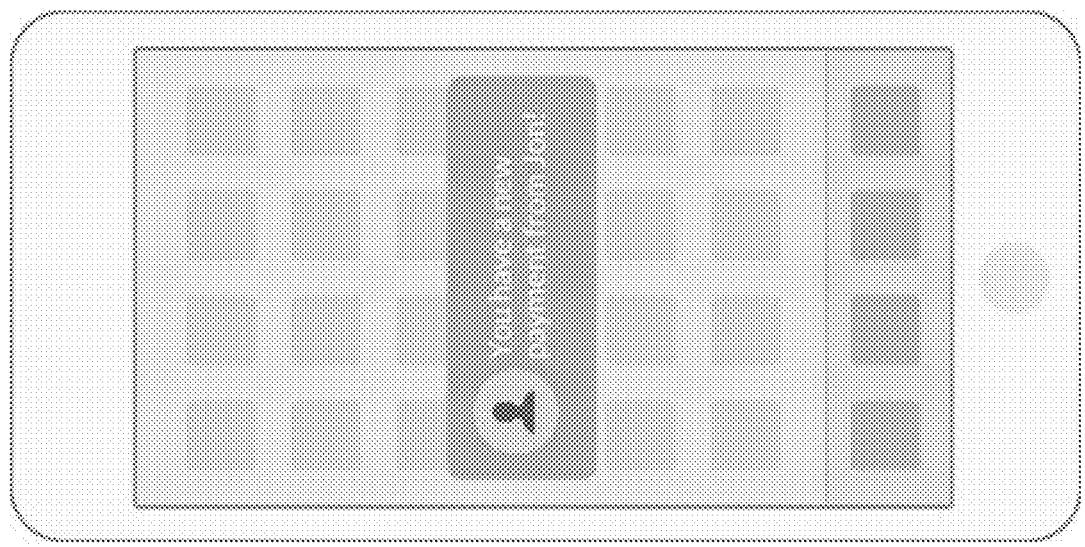
Figure 11C:
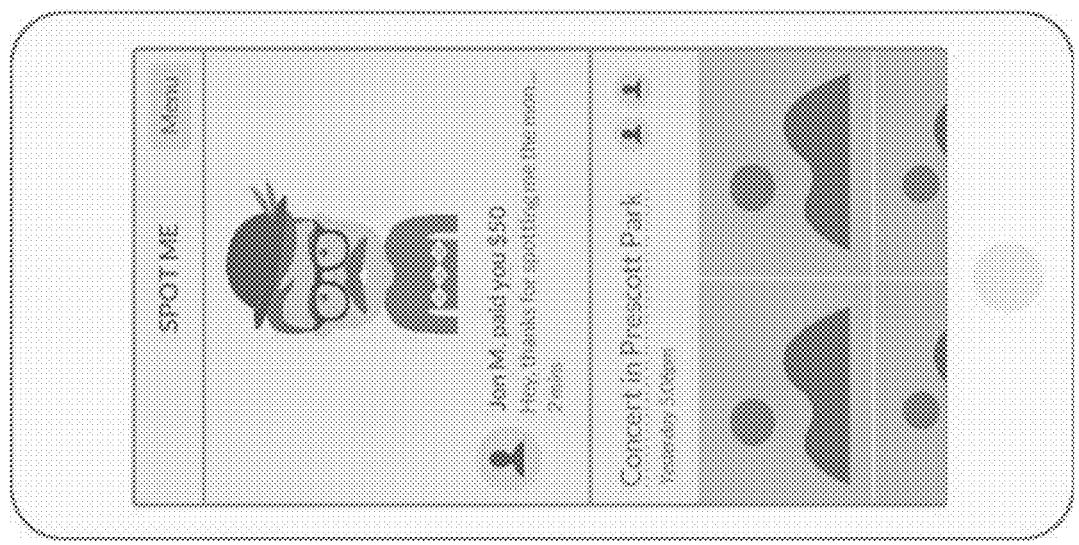

FIGS. 11A-C depict a series of screenshots on a computing device such as a smartphone for receiving a payment in system 10. In FIG. 11A, the user receives a pop-up window indicating that she has received a new payment (from Jon). Upon tapping the pop-up window or otherwise entering the app, the user is brought to the screen of FIG. 11B. In the upper section of screen 11B, a note appears indicating payment to the user by Jon B. in the amount of $50. Therebelow, a more detailed note appears taking, in this case, the form of a thank you note. Since the payment was made in connection with purchasing a hat in this example, a picture of a person wearing a hat appears. It could also be a photo of Jon B. wearing the hat, a video of Jon B. doing something clever with the hat, etc. At the bottom of the screen, additional exemplary functionality is available. The user may send a message back to Jon B. (e.g., "you're welcome", "you spent the money on a hat???", etc.) via the "Send Message" button. In addition, the user may see this transaction on her timeline via the "See in Timeline" button, in context with various other social or financial variables (e.g., the initial lending of the money, the store where the hat was purchased, a photo of Jon B.'s ensuing hat hair, etc.). FIG. 11C depicts the screen following the selection of "See in Timeline" from FIG. 11B. The repayment of the debt is now a financial-social transaction, replete with context. It is no mere ledger entry.

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art.

What is claimed is:

1. A computer-based system for managing multivariant transactions having non-linear components, comprising:
   at least one computer server;
   a plurality of user computing devices each including software enabling respective users to generate characteristic data of a different user based on at least one multivariant transaction;
   a database of users on said at least one server in communication with respective said user computing devices via a communications network, each user having a user profile with user information corresponding to the respective user, said characteristic data forming at least part of the user information, wherein said user profiles can be selectively linked to one another by the users via respective said user computing devices;
   a database of multivariant transactions in the form of a favors database between or among users on said at least one server, said multivariant transactions including proposed multivariant transactions and completed multivariant transactions, said multivariant transactions comprising specific performance transactions specific to at least one given first performer user performing a specific action on behalf of at least one second recipient user, wherein at least a plurality of said specific performance transactions are weighted differently from each other and wherein different instances of the same type of said specific performance transactions are weighted differently from each other based on at least said characteristic data of the second recipient user of said specific performance transaction, said characteristic data of the second recipient user of said specific performance transaction being at least partially determined by the plurality of users over a plurality of recorded completed specific performance transactions; and
   software residing at least in part on said at least one server receiving a request for a proposed multivariant transaction from one of said user computing devices of a proposed second recipient user;

executing the pairing of said characteristic data of said proposed second recipient user with said request for a proposed multivariant transaction by accessing said database of users;

pairing at least one proposed first performer user with said proposed second recipient user so that said paired at least one proposed first performer user can perform a proposed said specific performance transaction on behalf of said paired proposed second recipient user;

transmitting for display on said user computing device of the proposed second recipient user said at least one proposed first performer user;

enabling selection of said proposed first performer user by said proposed second recipient user via said user computing device of said proposed second recipient user;

receiving selection of said at least one proposed first performer user by said proposed second recipient user;

transmitting for display the requested proposed multivariant transaction to the user computing device associated with said proposed first performer user selected by said proposed second recipient user; and transmitting for display on said user computing device of the proposed second recipient user acceptance of said proposed multivariant transaction by said proposed first performer user selected by said proposed second recipient user.

2. A computer-based system for managing multivariant transactions having non-linear components according to claim 1, wherein a third user linked to a first performer user can access the proposed multivariant transactions available to the first performer user on said database via one of said user computing devices and offer to perform one or more of the multivariant transactions on behalf of a second recipient user instead of the first performer user performing the one or more multivariant transactions.

3. A computer-based system for managing multivariant transactions having non-linear components according to claim 1, wherein different types of said specific performance transactions are weighted differently with respect to each other.

4. A computer-based system for managing multivariant transactions having non-linear components according to claim 1, wherein user profiles include a trustworthiness score generated based on an aggregation of the user's specific performance transactions with other users.

5. A computer-based system for managing multivariant transactions having non-linear components according to claim 1, wherein said at least one server is linked to a financial institution.

6. A computer-based system for managing multivariant transactions having non-linear components according to claim 5, wherein said financial institution guarantees to the proposed recipient of a multivariant transaction that the proposed performer of a multivariant transaction is capable of performing the multivariant transaction prior to the transaction being finalized.

7. A computer-based system for managing multivariant transactions having non-linear components according to claim 1, wherein said plurality of differently weighted specific performance transactions are each assigned a point value on a scale of points.

8. A computer-based system for managing multivariant transactions having non-linear components according to claim 1, wherein said plurality of differently weighted specific performance transactions are each assigned to one of a plurality of tiers of differing relative values.

9. A computer-based system for managing multivariant transactions having non-linear components according to claim 1, said plurality of user computing devices each comprising at least one of a keyboard, mouse, pen, voice input device, touch input device, or camera.

10. A computer-based method for managing multivariant transactions having non-linear components, comprising:

providing a plurality of user computing devices each including software enabling respective users to generate characteristic data of a different user based on at least one multivariant transaction;

maintaining a database of users on at least one computer server in communication with respective of the user computing devices via a communications network, each user having a user profile with user information corresponding to the respective user, said characteristic data forming at least part of the user information;

selectively linking the user profiles to one another by the users via the respective user computing devices;

maintaining a database of multivariant transactions in the form of a favors database between or among users on the at least one computer server, said multivariant transactions including proposed multivariant transactions and completed multivariant transactions, said multivariant transactions comprising specific performance transactions specific to at least one given first performer user performing a specific action on behalf of at least one second recipient user;

weighting at least a plurality of said specific performance transactions differently from each other;

weighting different instances of the same type of said specific performance transactions differently from each other based on at least the characteristic data of the at least one second recipient user of said specific performance transaction;

at least partially determining the characteristic data of at least one second recipient user of said specific performance transaction by the plurality of users over a plurality of recorded completed specific performance transactions;

receiving, at the server, a request for a proposed multivariant transaction from one of said user computing devices of a proposed second recipient user;

pairing, at the server, the characteristic data of said proposed second recipient user with said request for a proposed multivariant transaction by accessing said database of users;

pairing, at the server, at least one said proposed first performer user with said proposed second recipient user so that said paired at least one proposed first performer user can perform a proposed said specific performance transaction on behalf of said paired proposed second recipient user;

transmitting, from the server, for display on said user computing device of the proposed second recipient user said at least one proposed first performer user;

enabling selection of said proposed first performer user by said proposed second recipient user via said user computing device of said proposed second recipient user;

receiving, at the server, selection of said at least one proposed first performer user by said proposed second recipient user;

transmitting, from the server, for display the requested proposed multivariant transaction to the user computing device associated with said proposed first performer user selected by said proposed second recipient user; and transmitting, at the server, for display on said user computing device of the proposed second recipient user acceptance of said proposed multivariant transaction by said proposed first performer user selected by said proposed second recipient user.

11. A computer-based method for managing multivariant transactions having non-linear components according to claim 10, further comprising the step of enabling a third user linked to a first performer user to access the proposed multivariant transactions available to the first performer user on said database via one of the user computing devices and offer to perform one or more of the transactions on behalf of a second recipient user instead of the first performer user performing the one or more transactions.

12. A computer-based method for managing multivariant transactions having non-linear components according to claim 10, further comprising the step of weighting on said database, different types of said specific performance transactions differently with respect to each other.

13. A computer-based method for managing multivariant transactions having non-linear components according to claim 10, further comprising the steps of:

aggregating a user's specific performance transactions with other users; and generating a trustworthiness score as part of the user profile based on the aggregation of specific performance transactions.

14. A computer-based method for managing multivariant transactions having non-linear components according to claim 10, wherein said maintaining steps are performed by a financial institution.

15. A computer-based method for managing multivariant transactions having non-linear components according to claim 14, further comprising the step of the financial institution guaranteeing to the proposed recipient of a multivariant transaction that the proposed performer of a multivariant transaction is capable of performing the multivariant transaction prior to the transaction being finalized.

16. A computer-based method for managing multivariant transactions having non-linear components according to claim 10, wherein said plurality of differently weighted specific performance transactions are each assigned a point value on a scale of points.

17. A computer-based method for managing multivariant transactions having non-linear components according to claim 10, wherein said plurality of differently weighted specific performance transactions are each assigned to one of a plurality of tiers of differing relative values.

18. A computer-based method for managing multivariant transactions having non-linear components according to claim 10, said plurality of user computing devices each comprising at least one of a keyboard, mouse, pen, voice input device, touch input device, or camera.

\* \* \* \* \*